United States Patent
Ding

(10) Patent No.: US 12,399,388 B2
(45) Date of Patent: Aug. 26, 2025

(54) OPTICAL LENS HAVING AN ANTIREFLECTION COATING REFLECTING HARMFUL BLUE LIGHT

(71) Applicant: ESSILOR INTERNATIONAL, Charenton le Pont (FR)

(72) Inventor: Xingzhao Ding, Singapore (SG)

(73) Assignee: Essilor International, Charenton-le-Pont (FR)

( * ) Notice: Subject to any disclaimer, the term of this patent is extended or adjusted under 35 U.S.C. 154(b) by 590 days.

(21) Appl. No.: 17/834,585

(22) Filed: Jun. 7, 2022

(65) Prior Publication Data
US 2022/0397772 A1 Dec. 15, 2022

(30) Foreign Application Priority Data
Jun. 9, 2021 (EP) .................................. 21305791

(51) Int. Cl.
G02C 7/10 (2006.01)
G02B 1/11 (2015.01)
G02B 1/116 (2015.01)
G02C 7/02 (2006.01)
G02C 7/04 (2006.01)
C03C 4/08 (2006.01)

(52) U.S. Cl.
CPC .............. G02C 7/104 (2013.01); G02B 1/116 (2013.01); G02C 7/022 (2013.01); G02C 7/049 (2013.01); C03C 4/08 (2013.01)

(58) Field of Classification Search
None
See application file for complete search history.

(56) References Cited

U.S. PATENT DOCUMENTS 7,692,855 B2   4/2010   Arrouy et al.
10,288,905 B2 *   5/2019   Passard .................... G02B 5/26
(Continued)

FOREIGN PATENT DOCUMENTS

EP          3 242 150       11/2017
WO       2008/024414        2/2008
(Continued)

OTHER PUBLICATIONS

Search report for EP 21 30 5791, dated Nov. 24, 2021, 3 pages.

Primary Examiner — Darryl J Collins
(74) Attorney, Agent, or Firm — NIXON & VANDERHYE

(57) ABSTRACT

The invention relates to an optical lens comprising a substrate having a front main face and a rear main face, at least one of the main faces comprising a multilayer antireflection coating having a stack of at least one high refractive index layer and at least one low refractive index layer, wherein the multilayer antireflection coating(s) present on the main face(s) provide(s) the optical lens with an average blue light reflection factor $R_m^{B1}$ within a wavelength range of from 420 nm to 450 nm, which is higher than or equal to 17%, for an angle of incidence ranging from 0° to 15°, and the multilayer antireflection coating provides said at least one main face with a mean light reflection factor $R_v$ between 380 nm and 780 nm lower than or equal to 0.5%, for an angle of incidence ranging from 0° to 15°.

20 Claims, 7 Drawing Sheets

(56) References Cited

U.S. PATENT DOCUMENTS

| | | |
|---|---|---|
| 2008/0206470 A1 | 8/2008 | Thomas et al. |
| 2015/0098058 A1 | 4/2015 | De Ayguavives et al. |
| 2015/0234208 A1* | 8/2015 | De Ayguavives ..... G02C 7/102 351/159.62 |
| 2015/0261010 A1 | 9/2015 | Kudla et al. |
| 2016/0154254 A1 | 6/2016 | Bolshakov et al. |
| 2017/0075040 A1* | 3/2017 | Bolshakov ............. G02C 7/022 |
| 2020/0150314 A1 | 5/2020 | Maitre et al. |

FOREIGN PATENT DOCUMENTS

| | | |
|---|---|---|
| WO | 2012/076714 | 6/2012 |
| WO | 2013/013929 | 1/2013 |
| WO | 2013/171435 | 11/2013 |
| WO | 2015/000534 | 1/2015 |
| WO | 2017/077359 | 5/2017 |
| WO | 2020/104381 | 5/2020 |
| WO | 2020/104392 | 5/2020 |
| WO | 2020/127564 | 6/2020 |

* cited by examiner

OPTICAL LENS HAVING AN ANTIREFLECTION COATING REFLECTING HARMFUL BLUE LIGHT

This application claims priority to EP 21305791.2 filed Jun. 9, 2021, the entire contents of which is hereby incorporated by reference.

The present invention relates to an optical article, in particular an ophthalmic lens, comprising a substrate coated with a highly transparent multilayer antireflection coating, typically a selective filtering coating, which can be used to reduce the blue light-induced phototoxic effects on the retina of a spectacle wearer, and a method of manufacturing such optical article.

Light that is visible to humans extends over a light spectrum ranging from a 380 nanometers (nm) wavelength to a 780 nm wavelength approximately. The part of this spectrum ranging from around 380 nm to around 500 nm corresponds to a high-energy, essentially blue light.

Many studies (see for example Kitchel E., "The effects of blue light on ocular health", Journal of Visual Impairment and Blindness Vol. 94, No. 6, 2000 or Glazer-Hockstein et al., Retina, Vol. 26, No. 1. p 1-4, 2006) suggest that part of the blue light has phototoxic effects on the human eye health, and especially on the retina. Ocular photobiology studies demonstrated that an excessively prolonged or intense exposure to blue light may induce severe ophthalmic diseases such as age-related macular degeneration (ARMD) or cataract.

ISO 8980-3 standard (2003) defines at Table B.1 the blue light hazard function $B(\lambda)$, which relates to the sensitivity of the human eye to low wavelength spectrum emissions. In view of this function shown on FIG. 2, it is recommended to limit the exposure of the eyes to blue light potentially harmful, in particular as regards the wavelength band with an increased dangerousness (420-455 nm).

However, part of this blue light, with a wavelength ranging from 465 nm to 495 nm approximately, is good to health since it is implicated in mechanisms for regulating biorhythms, referred to as "circadian cycles".

Eyeglasses are particularly suitable to offer protection against transmission of potentially harmful blue light to the retina. It is furthermore necessary to eliminate as much as possible the harmful influence of ultraviolet light (UV light) on the eye of a wearer of the lens.

Nowadays, with increasing usage of digital devices such as digital screens of computers and smartphones, visual fatigue and discomfort have become much more frequent. Beyond its cumulative effects on visual health, several studies suggest blue light exposure increases glare and visual discomfort. Filtering blue light may notably improve visual function in high glare situations.

Indeed, repeated exposures to artificial light, especially with blue light-emitting digital devices, has been identified as a cause of eyestrain and blurry vision, and contributes to symptoms of visual fatigue, discomfort and haze, since blue light is scattered in the environment and in the eye more than any other kind of visible light, increasing the effort needed to maintain visual focus. This is due to the fact that blue wavelengths of light are shorter wavelengths that are absorbed and scattered more efficiently than longer wavelengths by small particles. According to the Rayleigh scattering theory, the amount of scattering is inversely proportional to the fourth power of the wavelength. Other symptoms include ocular pain, red, dry or irritated eyes, headache, eye heaviness and tiredness, transient or persistent discomfort dependent on the duration of blue light exposure.

There is a growing demand for combining protection against blue-violet light, mainly from daylight, and visual comfort resulting from protection against eye-demanding LED blue light emission from digital devices. FIG. 1 shows a typical emission spectrum of standard cold LED from a digital device (tablet), with a sharp emission peak around 450 nm.

In order to adapt to the behavioral changes of the past 10 years and increasing digital usages, new filtering optical lenses are required, which would enable to minimize the amount of harmful blue light received by the retina, for long-term retinal protection, and also for better comfort.

It has already been suggested, for example in the patent application WO 2008/024414, to cut at least partially the troublesome part of the blue light spectrum from 400 nm to 460 nm, by means of a filter inhibiting the light in a suitable wavelength range, through absorption or through reflection. This can also be done by incorporating a yellow absorbing dye into the optical element.

WO 2013/171434 discloses an ophthalmic lens having a front main face and a back main face, at least one of both main faces comprising a filter, which provides the main face comprising said filter with a good angular selectivity defined by a parameter $\Delta(\theta,\theta')$, an average blue light reflection factor $R_m^{B1}$ within a wavelength range of from 420 nm to 450 nm, which is higher than or equal to 5%, for an angle of incidence ranging from 0° to 15°, and a spectral reflectivity curve for an angle of incidence ranging from 0° to 15°, this reflectivity curve having a maximum reflectivity at a wavelength of less than 435 nm and full width at half maximum (FWHM) higher than or equal to 80 nm. The coatings disclosed in this application are optimized to provide protection from blue-violet light up to 450 nm by reflection, but they cannot provide sufficient protection against LED blue light emission from digital devices, and their transmission in the other wavelengths of the visible range is not optimal.

US 2016/154254 discloses an ophthalmic lens comprising a transparent substrate with a front main face and with a rear main face, at least one of the main faces being coated with a multilayered antireflective coating comprising a stack of at least one layer having a refractive index higher than or equal 1.5 and at least one layer having a refractive index lower than 1.5, and a mean light reflection factor in the visible region $R_v$ being lower than or equal to 0.5%, for at least an angle of incidence lower than 35°. The coatings disclosed in this application have high antireflection performance in the visible range, and thus a high clarity, but no blue light reflecting function, with $R_m^{B1}$ values lower than 3%.

WO 2012/076714 discloses an ophthalmic lens comprising a substrate with a front main face and a rear main face, said rear main face being coated with a multilayered antireflective coating comprising a stack of at least one layer having a refractive index higher than 1.6 and of at least one layer having a refractive index lower than 1.5, with generally 3 to 7 layers, wherein the mean light reflection factor on said rear face in the visible region $R_v$ is lower than or equal to 1%. As for US 2016/154254, the antireflection coatings disclosed in this application have no blue light cutting function, with $R_m^{B1}$ values lower than 1.6%.

It is an object of the present invention to provide an optical lens combining a high antireflection performance in the visible range and an improved protection against harmful blue light, while keeping a good transparency (i.e., a high level of transmission in the visible range), and exhibiting a final color that is well accepted by the customer.

It is another object of the present invention to provide an optical lens, which enables an outstanding transmission within the wavelength range of from 465 nm to 495 nm, and more generally, wavelengths higher than 465 nm, so as to maintain a good vision for the wearer on one hand, and on the other hand, not to alter the circadian cycles. The difficulty lies in the fact that the wavelength ranges of from 420 nm to 450 nm to be filtered are very close to the wavelength ranges which should not be, or very little, filtered.

It is another object of the present invention to provide an optical lens, bringing visual benefit in front of LED screens. Such a lens would take the whole light irradiation originating from the surrounding area into account and comprise means capable of reducing the amount of blue light emitted by LED digital devices received by the eye in the wavelength range of from 440 nm to 460 nm, considering the fact that most commercial optical lenses cut less than 10% of light in this wavelength range, which is not enough to substantiate increased visual comfort.

It is another object of the present invention to provide an optical lens comprising a reflection filter with the hereabove mentioned properties, which would be easy and economical to implement on the industrial level. Its manufacturing process should be easily integrated into the classical manufacturing chain.

The inventors have found that these objectives could be achieved by using a coating that is antireflective in the visible range, except in the blue light range where it acts as a selective reflection filter and reduces the amount of blue light received by the eye in the wavelength range of from 420 nm to 450 nm.

Thus, the present invention relates to an optical lens comprising a substrate having a front main face and a rear main face, at least one main face of which comprising a multilayer antireflection coating comprising a stack of at least one high refractive index layer having a refractive index higher than 1.55 and at least one low refractive index layer having a refractive index of 1.55 or less, wherein the multilayer antireflection coating(s) present on the main face(s) range of from 420 nm to 450 nm, which is higher than or equal to 17%, for an angle of incidence ranging from 0° to 15°, and the multilayer antireflection coating provides said at least one main face with a mean light reflection factor $R_v$ between 380 nm and 780 nm, defined in the ISO 13666:1998 standard, lower than or equal to 0.5%, preferably lower than or equal to 0.3%, for an angle of incidence ranging from 0° to 15°.

The present invention provides new antireflection coatings with an improved antireflection efficiency, i.e., having very low mean light reflection factors $R_v$, which ensures higher clarity of the resulting coated lenses, combined with an improved blue light cutting efficiency in the 420-450 nm wavelength range, and generally with an improved blue light cutting efficiency in the 440-460 nm wavelength range (LED light region), and/or improved transmission of chronobiologic blue light in the 465-495 nm wavelength range.

A significant advantage of the present invention over the prior art is that no compromise is made between antireflection properties in the visible range and reflection of harmful blue light. Both requirements (low $R_v$, high $R_m^{B1}$) are simultaneously satisfied by the present multilayer coatings.

BRIEF DESCRIPTION OF THE DRAWINGS

The foregoing and other objects, features and advantages of the present invention will become readily apparent to those skilled in the art from a reading of the detailed description hereafter when considered in conjunction with the accompanying drawings, wherein.

The foregoing and other objects, features and advantages of the present invention will become readily apparent to those skilled in the art from a reading of the detailed description hereafter when considered in conjunction with the accompanying drawings, wherein.

DETAILED DESCRIPTION OF THE INVENTION

Figure 1:
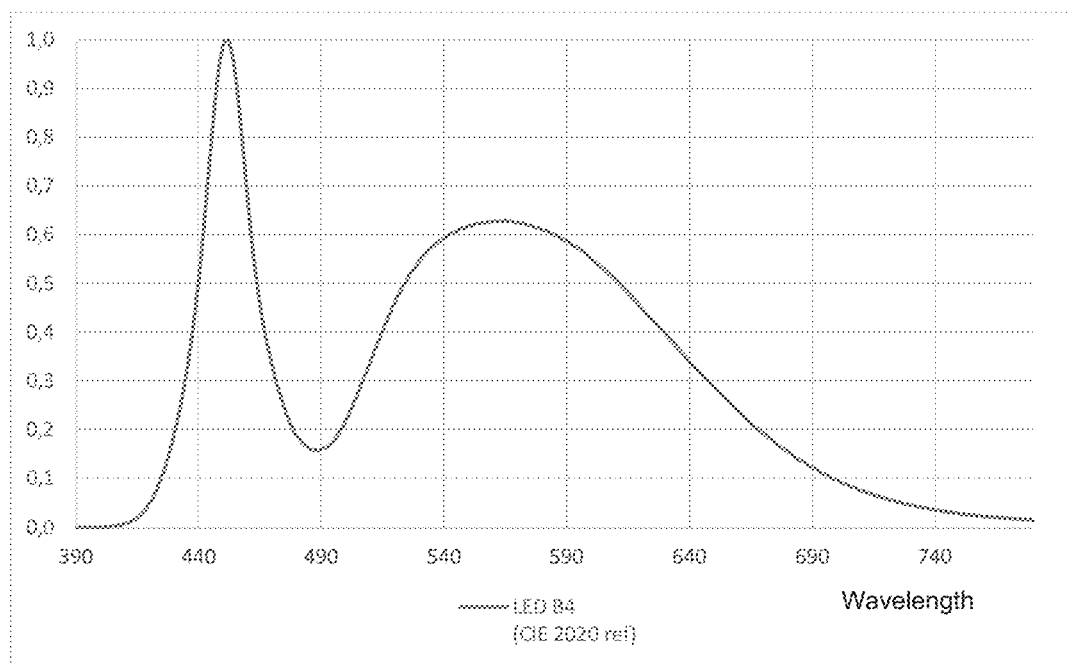
FIG. 1 shows a typical emission spectrum of standard cold LED from a digital device (relative intensity as a function of wavelength)
Figure 2:
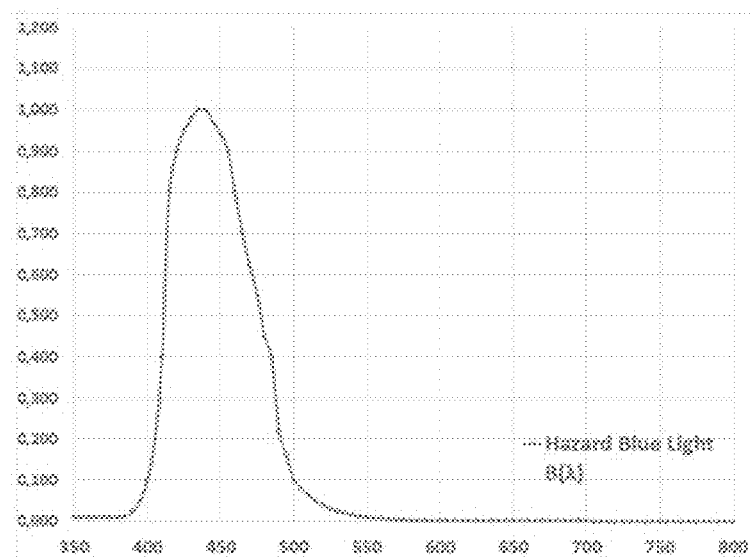
FIG. 2 represents the blue light hazard function B($\lambda$) defined in the ISO 8980-3 standard.

The terms "comprise" (and any grammatical variation thereof, such as "comprises" and "comprising"), "have" (and any grammatical variation thereof, such as "has" and "having"), "contain" (and any grammatical variation thereof, such as "contains" and "containing"), and "include" (and any grammatical variation thereof, such as "includes" and "including") are open-ended linking verbs. They are used to specify the presence of stated features, integers, steps or components or groups thereof, but do not preclude the presence or addition of one or more other features, integers, steps or components or groups thereof. As a result, a method, or a step in a method, that "comprises," "has," "contains," or "includes" one or more steps or elements possesses those one or more steps or elements, but is not limited to possessing only those one or more steps or elements.

Unless otherwise indicated, all numbers or expressions referring to quantities of ingredients, ranges, reaction conditions, etc. used herein are to be understood as modified in all instances by the term "about".

When an optical article comprises one or more surface coatings, the phrase "to deposit a coating or layer onto the optical article" means that a coating or layer is deposited onto the outermost coating of the optical article, i.e., the coating which is the closest to the air.

In the present application, a coating that is "on" a substrate/coating or which has been deposited "onto" a substrate/coating is defined as a coating that (i) is positioned above the substrate/coating, (ii) is not necessarily in contact with the substrate/coating, that is to say one or more intermediate coatings may be arranged between the substrate/coating and the coating in question (however, it is preferably in contact with said substrate/coating), and (iii) does not necessarily completely cover the substrate/coating. When "a layer 1 is arranged under a layer 2", it is intended to mean that layer 2 is more distant from the substrate than layer 1.

The term "coating" is understood to mean any layer, layer stack or film, which may be in contact with the substrate and/or with another coating, for example a sol-gel coating or a coating made of an organic resin. A coating may be deposited or formed through various methods, including wet processing, gaseous processing, and film transfer.

The term "sheet" is understood to mean a single layer (monolayer) or a bilayer, i.e., a set of two layers in direct contact with each other. When a high refractive index sheet (having a refractive index higher than 1.55) has two layers, both layers are high refractive index layers. Similarly, when a low refractive index sheet (having a refractive index lower than or equal to 1.55) has two layers, both layers are low refractive index layers.

In the present application, a layer based on a material is defined as a layer comprising at least 80% by weight of said material, more preferably at least 90% by weight of said material, even better consisting of a layer of said material. For example, a $ZrO_2$-based layer comprises at least 80% by weight of $ZrO_2$.

The optical article prepared according to the present invention is a transparent optical article, preferably an optical lens or lens blank, and more preferably an ophthalmic lens or lens blank. Said ophthalmic lens may be a polarized lens, or a solar, tinted lens, with a corrective action or not.

The optical article may be coated on its convex main face (front side), concave main face (back/rear side), or both faces with the multilayer antireflection coating according to the invention, preferably on the convex (front) main face, so as to avoid multiple reflections of light arriving on the lens. As used herein, the rear face of the substrate is intended to mean the face which, when using the article, is the nearest from the wearer's eye, in the cases of ophthalmic lenses. It is generally a concave face. On the contrary, the front face of the substrate is the face which, when using the article, is the most distant from the wearer's eye. It is generally a convex face. The optical article can also be a plano article.

In an embodiment, the optical lens according to the invention is coated on both faces (front and rear main faces) with antireflection coatings according to the invention. The coatings may be identical or different.

In another embodiment, the main face coated with the filter according to the invention is the front main face of the lens and the back main face is coated with a traditional antireflection coating or preferably an antireflection coating with a low reflection in the UV region, such as those described in WO 2012/076714.

Herein, the term "lens" means an organic or inorganic glass lens, comprising a lens substrate, which may be coated with one or more coatings of various natures.

The term "ophthalmic lens" is used to mean a lens adapted to a spectacle frame, for example to protect the eye and/or correct the sight. Said lens can be chosen from afocal, unifocal, bifocal, trifocal and progressive lenses. Although ophthalmic optics is a preferred field of the invention, it will be understood that this invention can be applied to optical articles of other types, such as, for example, lenses for optical instruments, in photography or astronomy, optical sighting lenses, ocular visors, optics of lighting systems, etc.

In the present description, unless otherwise specified, an optical article/material is understood to be transparent when the observation of an image through said optical article is perceived with no significant loss of contrast, that is, when the formation of an image through said optical article is obtained without adversely affecting the quality of the image. This definition of the term "transparent" can be applied to all objects qualified as such in the description, unless otherwise specified.

A substrate, in the sense of the present invention, should be understood to mean an uncoated substrate, and generally has two main faces. The substrate may in particular be an optically transparent material having the shape of an optical article, for example an ophthalmic lens destined to be mounted in glasses. In this context, the term "substrate" is understood to mean the base constituent material of the optical lens and more particularly of the ophthalmic lens. This material acts as support for a stack of one or more coatings or layers.

The substrate may be made of mineral glass or organic glass, preferably organic glass. The organic glasses can be either thermoplastic materials such as polycarbonates and thermoplastic polyurethanes or thermosetting (cross-linked) materials such as diethylene glycol bis(allylcarbonate) polymers and copolymers (in particular CR-39® from PPG Industries), thermosetting polyurethanes, polythiourethanes, preferably polythiourethane resins having a refractive index of 1.60 or 1.67, polyepoxides, polyepisulfides, such as those having a refractive index of 1.74, poly(meth)acrylates and copolymers based substrates, such as substrates comprising (meth)acrylic polymers and copolymers derived from bisphenol-A, polythio(meth)acrylates, as well as copolymers thereof and blends thereof. Preferred materials for the lens substrate are polycarbonates (PC), diethylene glycol bis (allylcarbonate) polymers and substrates obtained from thermosetting polythiourethane resins, which are marketed by the Mitsui Toatsu Chemicals company as MR series, in particular MR6®, MR7® and MR8® resins. The latter substrates as well as the monomers used for their preparation are especially described in the U.S. Pat. Nos. 4,689,387, 4,775,733, 5,059,673, 5,087,758 and 5,191,055.

Prior to depositing the antireflection coating or other functional coatings, the surface of the article is usually submitted to a physical or chemical surface activating and cleaning pre-treatment, so as to improve the adhesion of the layer to be deposited, such as disclosed in WO 2013/013929. This pre-treatment is generally performed on the surface of an abrasion- and/or scratch-resistant coating (hard coat).

This pre-treatment is generally carried out under vacuum. It may be a bombardment with energetic species, for example an ion beam method ("Ion Pre-Cleaning" or "IPC") or an electron beam method, a corona treatment, an ion spallation treatment, an ultraviolet treatment or a plasma treatment under vacuum, using typically an oxygen or an argon plasma. It may also be an acid or a base surface treatment and/or a solvent surface treatment (using water or an organic solvent) with or without ultrasonic treatment. Many treatments may be combined. Thanks to these cleaning treatments, the cleanliness of the substrate surface is optimized.

By energetic species, it is meant species with an energy ranging from 1 to 300 eV, preferably from 1 to 150 eV, and more preferably from 10 to 150 eV and most preferably from 40 to 150 eV. Energetic species may be chemical species such as ions, radicals, or species such as photons or electrons.

The antireflection coating may be virtually any antireflection coating conventionally used in the field of optics, in particular ophthalmic optics. The optical properties of such a coating, such as for example reflectivity, result from interferences due to the multiple reflections at the air/layer and substrate/layer interfaces.

An anti-reflection coating is a coating, deposited on the surface of an article, which improves the anti-reflection properties of the final article. It reduces the reflection of light at the article/air interface over a relatively broad portion of the visible spectrum.

The present antireflection coating is configured to selectively inhibit transmission of at least part of blue light in a narrow range of wavelengths, by reflection. Thus, it represents a "blue cut filter" and is useful for protection purposes. By selective reflection of light in a narrow range of wavelengths, potentially harmful light will not reach the eyes of a wearer. This is particularly the case for blue light in the range 420 nm-450 nm, and/or in the range 440 nm-460 nm, which are harmful for retina.

As used herein, a means "selectively reflects" a wavelength range if it inhibits at least some transmission within the range by reflection, while having little or no effect on reflection of wavelengths neighboring the wavelength range.

The multilayer antireflection coating of the invention comprises a stack of at least one high refractive index layer having a refractive index higher than 1.55 and at least one low refractive index layer having a refractive index of 1.55 or less.

More preferably, it comprises at least two layers (LI) with a low refractive index and at least two layers (HI) with a high refractive index. It preferably comprises at least three layers (HI) with a high refractive index. The total number of layers in the antireflection coating is preferably higher than or equal to 3, more preferably higher than or equal to 5 or 6. It is preferably lower than or equal to 11, 8 or 7, more preferably lower than or equal to 6, most preferably equal to 6 layers. In one embodiment, it ranges from 5 to 10.

The inventors found that when using a higher number of layers in the antireflection coating, it becomes easier to design coatings having high $R_m^{B1}$ and $R_m^{B3}$ reflection factors, while keeping low $R_v$ and $R_m^{B2}$ factors. In other words, to achieve the same level of $R_m^{B3}$, the antireflection coatings having a higher number of layers can be designed with a lower $R_v$, a lower $R_m^{B2}$ and a higher $R_m^{B1}$. The various reflection factors are defined hereunder.

As used herein, a layer of the antireflection coating is defined as having a thickness higher than or equal to 1 nm. Thus, any layer having a thickness lower than 1 nm will not be considered when counting the number of layers in the antireflection coating. The optional sub-layer and impedance layers either are not considered when counting the number of layers of the antireflection coating or when indicating its thickness.

HI layers and LI layers do not necessarily alternate with each other in the stack, although they also may, according to one embodiment of the invention. Two HI layers (or more) may be deposited onto each other, as well as two LI layers (or more) may be deposited onto each other.

In the present application, a layer of the antireflection coating is said to be a layer with a high refractive index (HI) when its refractive index is higher than 1.55, preferably higher than or equal to 1.6, even more preferably higher than or equal to 1.8 or 1.9 and most preferably higher than or equal to 2. Said HI layers preferably have a refractive index lower than or equal to 2.2 or 2.1. A layer of an antireflection coating is said to be a low refractive index layer (LI) when its refractive index is lower than or equal to 1.55, preferably lower than or equal to 1.52, more preferably lower than or equal to 1.48 or 1.47. Said LI layer preferably has a refractive index higher than or equal to 1.1.

The HI layer generally comprises one or more metal oxides such as, without limitation, zirconia ($ZrO_2$), titanium oxide such as titanium dioxide ($TiO_2$), alumina ($Al_2O_3$), tantalum pentoxide ($Ta_2O_5$), neodymium oxide ($Nd_2O_5$), praseodymium oxide ($Pr_2O_3$), praseodymium titanate (PrTiO$_3$), $La_2O_3$, $Nb_2O_5$, $Y_2O_3$.

Optionally, the HI layers may further contain silica or other materials with a low refractive index, provided they have a refractive index higher than 1.55 as indicated hereabove. The preferred materials include $ZrO_2$, $PrTiO_3$, $Nb_2O_5$, $Ta_2O_5$, $Y_2O_3$ and mixtures thereof.

The most preferred material is $Ta_2O_5$. In comparison with other materials such as $ZrO_2$, antireflection coatings using $Ta_2O_5$ as a high refractive index material are thinner (for stacks with the same number of layers). Further, to achieve the same level of $R_m^{B3}$, the antireflection coatings using $Ta_2O_5$ as a high refractive index material can be designed with a lower $R_v$, a lower $R_m^{B2}$ and a higher $R_m^{B1}$. The various reflection factors are defined hereunder.

The LI layer is also well known and may comprise, without limitation, $SiO_2$, $MgF_2$, $ZrF_4$, $AlF_3$, $Na_5Al_3F_{14}$, $Na_3[AlF_6]$, or a mixture of silica and alumina, especially silica doped with alumina, the latter contributing to increase the antireflection coating thermal resistance. The LI layer is preferably a layer comprising at least 80% by weight of silica, more preferably at least 90% by weight of silica, relative to the layer total weight, and even more preferably consists in a silica layer.

Optionally, the LI layers may further contain materials with a high refractive index, provided that the refractive index of the resulting layer is lower than or equal to 1.55.

The antireflection coating external (outermost) layer, i.e., its layer that is the furthest from the substrate, is generally a low refractive index layer having a refractive index of 1.55 or less and a thickness preferably higher than or equal to 100 nm. It may be a silica-based layer, comprising at least 80% by weight of silica, more preferably at least 90% by weight of silica (for example a silica layer doped with alumina), relative to the layer total weight, and even more preferably consists of a silica layer.

The antireflection coating innermost layer, i.e., its layer that is in direct contact with the sub-layer (when present) or the substrate, is preferably a high refractive index layer.

Generally, the HI and/or LI layers have a physical thickness ranging from 5 to 120 nm, preferably from 20 to 110 nm. Their thickness may vary to a large extent, depending for instance on the desired properties for the layer, on the layer material, on the deposition technique and/or on the layer position in the stack.

Generally, the total thickness of the antireflection coating is lower than or equal to 1 μm, preferably lower than or equal to 800 nm, more preferably lower than or equal to 700 nm and even more preferably lower than or equal to 600 or 500 nm. The antireflection coating total thickness is generally higher than or equal to 100 nm, preferably higher than or equal to 150 or 200 nm.

In particular embodiments of the invention, the antireflection coating comprises 6 to 9 layers, and has a total thickness preferably ranging from 350 nm to 600 nm.

Moreover, the optical article has a good resistance to heat and temperature variations, i.e., a high critical temperature. In the present patent application, the critical temperature of an article is defined as being the temperature starting from which cracks appear in a coating present at the surface of the substrate (on either main face), which results in degradation of the coating, generally the antireflection coating. The critical temperature of an article coated according to the invention is preferably ≥70° C., more preferably ≥75° C., 80° C., 90° C., 100° C. or 110° C.

It is possible to define a $R_{T1}$ ratio, which is slightly different from the Rr ratio defined in U.S. Pat. No. 7,692, 855:

$$R_{T1} = \frac{\text{sum of the physical thicknesses of the low refractive index layers of the multilayer antireflection coating}}{\text{sum of the physical thicknesses of the high refractive index layers of the multilayer antireflection coating}}$$

In the present invention, only layers of the antireflection coating are taken into account for the calculation of said ratio $R_{T1}$, i.e., only the layers located above the optional sub-layer.

In one embodiment $R_{T1}$ is higher than or equal to 0.8, preferably higher than or equal to 1, 1.3, 1.5, 1.6, 1.75, 2, 2.1, 2.2 or 2.5. In one embodiment, $R_{T1}$ is lower than 5, preferably lower than at least one of the following values 4, 3.5, 3. In another embodiment, $R_{T1}$ ranges from 0.8 to 2.5. It is preferable to have a high $R_{T1}$ ratio, in order to have an article showing a higher critical temperature, while exhibiting in the same time high abrasion resistance.

In the present invention, the multilayer antireflection coating can be deposited onto a monolayer sub-layer having a thickness higher than or equal to 140 nm. It should be noted that such sub-layer does not belong to the antireflection coating. Said sub-layer in preferably in direct contact with the antireflection coating.

As used herein, an antireflection coating sub-layer or adhesion layer is intended to mean a relatively thick coating, used in order to improve mechanical properties such as abrasion resistance and/or scratch resistance of the antireflection coating and/or so as to reinforce its adhesion to the substrate or to the underlying coating.

The sub-layer has a thickness that is generally lower than or equal to any one of the following values: 600 nm, 500 nm, 450 nm, 400 nm, 375 nm, 300 nm, 250 nm. The sub-layer has a thickness that is higher than or equal to 140 nm, preferably higher than or equal to 145, 150, 160 or 180 nm. Increasing the thickness of the sub-layer leads to an abrasion resistance improvement, but preferably not to the point where a light absorption could occur, which, depending on the nature of the sub-layer, could significantly reduce the visual transmission factor $T_v$.

The sub-layer is preferably a $SiO_2$-based layer, this layer comprising preferably at least 80% by weight of silica, more preferably at least 90% by weight of silica, relative to the layer total weight, and even more preferably consists of a silica layer. In another embodiment, this $SiO_2$-based layer is a silica layer doped with alumina, in amounts such as defined hereabove, preferably consists of a silica layer doped with alumina.

A sub-layer of an antireflection coating is a category of layer that is well-identifiable and well-known to those of ordinary skill in the art, and cannot be confused with an abrasion-resistant and/or scratch-resistant coating (hard coat), described later in the present application.

It is preferred to use a sub-layer of the monolayer type. However, the sub-layer may be laminated (multilayer), especially when the sub-layer and the underlying coating (or the substrate, should the sub-layer be directly deposited onto the substrate) have a substantial refractive index difference. In such an event, the sub-layer may comprise, in addition to a layer having a thickness generally higher than or equal to 140 nm, which is referred to as the main layer, preferably at most two or three other layers ("impedance layers"), interleaved in between the optionally coated substrate and the main layer, which is generally a layer based on silica. Such additional layers are preferably thin layers, the function of which is to limit the multiple reflections at the sub-layer/ underlying coating interface or at the interface sub-layer/ substrate interface, whichever applies.

A multilayered sub-layer comprises preferably, in addition to the main layer, a layer with a high refractive index and with a thickness preferably lower than or equal to 80 nm, more preferably lower than or equal to 50 nm, and optionally a layer with a low refractive index, and with a thickness preferably lower than or equal to 80 nm, more preferably lower than or equal to 50 nm. The layer with a high refractive index does directly contact the substrate or the underlying coating, whichever applies.

In the present invention, the monolayer sub-layer can be deposited onto a system of three sheets (A), (B) and (C), deposited in this order onto the optionally coated substrate, such as disclosed in WO 2020/104392. It should be noted that such sheets do not belong to the antireflection coating. Said sub-layer is in direct contact with sheet (C). This mechanical and adherence system allows to improve abrasion resistance of the optical article without suffering from adhesion issues between the sub-layer and the underlying coating or the substrate.

The sub-layer (given its relatively high thickness) and impedance sheets (A) to (C) generally have a limited influence on the overall filtering effect of the antireflection stack.

The first high refractive index sheet (A), having a refractive index higher than 1.55, does not comprise any $Ta_2O_5$ layer and preferably does not comprise any $Ta_2O_5$-based layer. Sheet (A) may comprise one single high refractive index layer or two high refractive index layers in direct contact. The layer(s) of sheet (A) generally comprise(s) one or more metal oxides, which can be chosen from the metal oxides previously described for the high refractive index layers of the antireflection coating.

Sheet (A) preferably comprises a $ZrO_2$-based layer, more preferably is a $ZrO_2$-based layer. In one embodiment, sheet (A) comprises a $ZrO_2$ layer, more preferably is a $ZrO_2$ layer.

Sheet (A) preferably has a thickness lower than or equal to 65 nm, more preferably lower than or equal to 60 nm, 50 nm, 40 nm, 30 nm, 25 nm, 20 nm or 15 nm. Sheet (A) preferably has a thickness higher than or equal to 4 nm, more preferably higher than or equal to 5, 10 or 20 nm.

The second low refractive index sheet (B), having a refractive index of 1.55 or less, is in direct contact with sheet (A). Sheet (B) may comprise one single low refractive index layer or two low refractive index layers in direct contact. The layer(s) of sheet (B) generally comprise(s) one or more metal oxides, which can be chosen from the metal oxides previously described for the low refractive index layers of the antireflection coating.

Sheet (B) preferably comprises a $SiO_2$-based layer, more preferably is a $SiO_2$-based layer. In one embodiment, sheet (B) comprises a $SiO_2$ layer, more preferably is a $SiO_2$ layer.

Sheet (B) preferably has a thickness lower than or equal to 80 nm, more preferably lower than or equal to 75 nm, 60 or 50 nm. Sheet (B) preferably has a thickness higher than or equal to 20 nm, more preferably higher than or equal to 25 nm or 30 nm. Having a sufficiently thick sheet (B) is important for obtaining an improved abrasion resistance.

The third high refractive index sheet (C), having a refractive index higher than 1.55, is in direct contact with sheet (B). Sheet (C) may comprise one single high refractive index layer or two high refractive index layers in direct contact. The layer(s) of sheet (C) generally comprise(s) one or more metal oxides, which can be chosen from the metal oxides previously described for the high refractive index layers of the antireflection coating, such as $Ta_2O_5$, $Nb_2O_5$, $PrTiO_3$, $ZrO_2$ and $Y_2O_3$.

Sheet (C) preferably comprises a $ZrO_2$-based layer, more preferably is a $ZrO_2$-based layer. In one embodiment, sheet (C) comprises a $ZrO_2$ layer, more preferably is a $ZrO_2$ layer. Sheet (C) preferably has a thickness lower than or equal to 60 nm, more preferably lower than or equal to 50 nm, 40 nm, 30 nm, 25 nm, 20 nm or 15 nm. In one embodiment, these thickness requirements are simultaneously satisfied by sheets (A) and (C). Sheet (A) preferably has a thickness higher than or equal to 4 nm, more preferably higher than or equal to 5 nm, 10 nm or 20 nm.

The total thickness of sheets (A), (B) and (C) preferably ranges from 40 to 200 nm, more preferably from 75 to 160 nm or from 100 to 150 nm.

The refractive indexes of sheets (A) and (C) can be independently chosen from the refractive indexes previously described for the high refractive index layers of the antireflection coating. The refractive index of sheet (B) can be chosen from the refractive indexes previously described for the low refractive index layers of the antireflection coating.

The total number of layers of the system of sheets (A) to (C) ranges from 3 to 6, more preferably from 3 to 4 or 5, and is ideally equal to three. In other words, sheets (A) and/or (B) and/or (C) are preferably monolayers. This system preferably comprises, in the direction moving away from the substrate, a $ZrO_2$-based layer, a $SiO_2$-based layer, and a $ZrO_2$-based layer, more preferably consists of a $ZrO_2$-based layer, a $SiO_2$-based layer, and a $ZrO_2$-based layer.

Optionally, the exposed surface of the sub-layer, when present, may be submitted, prior to depositing the first layer of the antireflection coating, to a physical or a chemical activation treatment which may be selected from the pre-treatments the substrate may undergo prior to depositing the sub-layer and which have already been mentioned hereabove. The preferred pre-treatment is an ion bombardment, for example by using an ion gun-generated argon ion beam. Such physical or chemical activation treatments (preferably an ionic bombardment treatment) may also be performed on the exposed surface of one or more layer(s) of the multilayer antireflection coating, prior to depositing the subsequent layer of said multilayer antireflection coating.

The optical article of the invention may be made antistatic, that is to say not to retain and/or develop a substantial static charge, by incorporating at least one electrically conductive layer into the stack present on the surface of the article, preferably in the antireflection coating.

The ability for a lens to evacuate a static charge obtained after rubbing with a piece of cloth or using any other procedure to generate a static charge (charge applied by corona . . . ) may be quantified by measuring the time it takes for said charge to dissipate. Thus, antistatic lenses have a discharge time of about a few hundred milliseconds, preferably 500 ms or less, whereas it is of about several tens of seconds for a static lens. In the present application, discharge times are measured according to the method exposed in the French application FR 2943798.

As used herein, an "electrically conductive layer" or an "antistatic layer" is intended to mean a layer which, due to its presence on the surface of a substrate, decreases the ability of the optical article to attract dust/particles due to charge accumulation. Preferably, when applied onto a non-antistatic substrate (i.e., having a discharge time higher than 500 ms), the antistatic layer enables the optical article not to retain and/or develop a substantial static charge, for example to have a discharge time of 500 ms or less after a static charge has been applied onto the surface thereof, so that small dust is prevented from adhering to the optical article due to prevention of static effects.

The electrically conductive layer may be located at various places in the stack, generally in or in contact with the antireflection coating, provided that the reflective or antireflective properties thereof are not affected. It is preferably located between two layers of the antireflection coating, and/or is preferably adjacent to a layer with a high refractive index of such antireflection coating. In an embodiment, the electrically conductive layer is located immediately under a layer with a low refractive index of the antireflection coating, most preferably is the penultimate layer of the antireflection coating by being located immediately under the LI external layer of the antireflection coating.

In one embodiment, the electrically conductive layer is in direct contact with two layers having a refractive index of 1.55 or less, and said electrically conductive layer is preferably located in penultimate position of the antireflection coating in the direction moving away from the substrate.

The electrically conductive layer should be thin enough not to alter the transparency of the antireflection coating. The electrically conductive layer is preferably made from an electrically conductive and highly transparent material, generally an optionally doped metal oxide. In this case, the thickness thereof preferably ranges from 1 to 15 nm, more preferably from 1 to 10 nm, ideally from 2 to 8 nm. Preferably, the electrically conductive layer comprises an optionally doped metal oxide, selected from indium, tin, zinc oxides and mixtures thereof. Indium-tin oxide ($In_2O_3$: Sn, tin-doped indium oxide), aluminum-doped zinc oxide (ZnO:Al), indium oxide ($In_2O_3$) and tin oxide ($SnO_2$) are preferred. In a most preferred embodiment, the electrically conductive and optically transparent layer is an indium-tin oxide layer, noted ITO layer or a $SnO_2$ layer.

Generally, the electrically conductive layer contributes, within the stack, but in a limited manner because of its low thickness, to obtaining antireflection properties and typically represents a layer with a high refractive index in said coating.

The electrically conductive layer may be deposited according to any suitable method, for example by vacuum evaporation deposition, preferably ion-beam-assisted (IAD, described below) to increase its transparence, or by means of cathode sputtering.

The electrically conductive layer may also be a very thin layer of a noble metal (Ag, Au, Pt, etc.) typically smaller than 1 nm in thickness and preferably less than 0.5 nm in thickness.

The various layers of the antireflection coating, the sub-layer, and sheets (A) to (C) are preferably deposited by vapor phase deposition, under vacuum, according to any of the following methods: i) by evaporation, optionally under ion beam assistance; ii) by ion-beam spraying; iii) by cathode sputtering; iv) by plasma-assisted chemical vapor deposition. These various methods are described in the following references "Thin Film Processes" and "Thin Film Processes II," Vossen & Kern, Ed., Academic Press, 1978 and 1991, respectively. A particularly recommended method is evaporation under vacuum. Preferably, the deposition of each of the above-mentioned layers is conducted by evaporation under vacuum. Such a process does advantageously avoid heating the substrate, which is particularly interesting for coating heat-sensitive substrates such as organic glasses.

A treatment step with energetic species such as previously defined may also be carried out, simultaneously whilst depositing one or more of the various layers of the antireflection coating, sub-layer, or sheets (A) to (C). In particular, working under ion assistance enables to pack said layers while they are being formed, and increases their compression and refractive index. The use of ion assistance during the deposition of a layer produces a layer that is structurally different from a layer deposited without ion assistance.

The ion assisted deposition method or IAD is notably described in US patent application 2006/017011 and in U.S. Pat. No. 5,268,781. Vapor phase deposition under ion assistance comprises depositing onto a substrate a layer of material by simultaneously bombarding by means of an ion beam said layer while it is being formed, and preferably under ion bombardment achieved by means of an ion gun. The ion bombardment leads to an atomic rearrangement in the coating being formed, which increases its density. The IAD not only allows an improvement of the deposited layer adhesion, but also an increase in their refractive index. The IAD operation may be performed by means of an ion gun, where ions are particles composed of gas atoms from which one or more electron(s) is or are extracted. It does preferably consist of bombarding the surface to be treated with oxygen ions. Other ionized gases may be used, either combined with oxygen, or not, for example argon, nitrogen, in particular a mixture of $O_2$ and argon according to a volume ratio ranging from 2:1 to 1:2. Preferred IAD treatments for the deposition of thin layers according to the present invention are disclosed in WO 2020/104392.

Optionally, the deposition of one or more of the layers is performed by supplying (a supplementary) gas during the deposition step of the layer in a vacuum chamber, such as disclosed in US 2008/206470. Concretely, an additional gas such as a rare gas, for example argon, krypton, xenon, neon; a gas such as oxygen, nitrogen, or mixtures of two gases or more amongst these, is or are introduced into the vacuum deposition chamber while the layer is being deposited. The gas employed during this deposition step is not an ionized gas, more preferably not an activated gas.

This gas supply makes it possible to regulate the pressure and differs from an ionic bombardment treatment, such as ion assistance. It generally enables the limitation of stress in the antireflection coating and to reinforce the adhesion of the layers. When such deposition method is used, which is called deposition under gas pressure regulation, it is preferred to work under an oxygen atmosphere (so called "passive oxygen"). The use of an additional gas supply during the deposition of a layer produces a layer that is structurally different from a layer deposited without additional gas supply. Preferred embodiments for gas supply during the deposition of thin layers according to the present invention are disclosed in WO 2020/104392.

The antireflection coating/optional sub-layer/optional sheets (A) to (C) system may be deposited directly onto a bare substrate. In some applications, it is preferred that the main surface of the substrate be coated with one or more functional coatings improving its optical and/or mechanical properties, prior to depositing the antireflection coating of the invention. These functional coatings traditionally used in optics may be, without limitation, an impact-resistant primer layer, an abrasion- and/or scratch-resistant coating (hard coat), a polarized coating, an antistatic coating, a photochromic coating, a tinted coating or a stack made of two or more of such coatings.

The impact-resistant primer coating which may be used in the present invention can be any coating typically used for improving impact resistance of a finished optical article. By definition, an impact-resistant primer coating is a coating which improves the impact resistance of the finished optical article as compared with the same optical article but without the impact-resistant primer coating.

Typical impact-resistant primer coatings are (meth)acrylic based coatings and polyurethane based coatings. In particular, the impact-resistant primer coating according to the invention can be made from a latex composition such as a poly(meth)acrylic latex, a polyurethane latex or a polyester latex.

Preferred primer compositions include compositions based on thermoplastic polyurethanes, such as those described in the patents JP 63-141001 and JP 63-87223, poly(meth)acrylic primer compositions, such as those described in the U.S. Pat. Nos. 5,015,523 and 6,503,631, compositions based on thermosetting polyurethanes, such as those described in the patent EP 0404111 and compositions based on poly(meth)acrylic latexes or polyurethane latexes, such as those described in the U.S. Pat. No. 5,316,791 and EP 0680492. Preferred primer compositions are compositions based on polyurethanes and compositions based on latexes, in particular polyurethane latexes, poly(meth)acrylic latexes and polyester latexes, as well as their combinations. In one embodiment, the impact-resistant primer comprises colloidal fillers.

Poly(meth)acrylic latexes are latexes based on copolymers essentially made of a (meth)acrylate, such as for example ethyl (meth)acrylate, butyl (meth)acrylate, methoxyethyl (meth)acrylate or ethoxyethyl (meth)acrylate, with at least one other co-monomer in a typically lower amount, such as for example styrene.

Commercially available primer compositions suitable for use in the invention include the Witcobond® 232, Witcobond® 234, Witcobond® 240, Witcobond® 242 compositions (marketed by BAXENDEN CHEMICALS), Neorez® R-962, Neorez® R-972, Neorez® R-986 and Neorez® R-9603 (marketed by ZENECA RESINS), and Neocryl® A-639 (marketed by DSM coating resins).

The thickness of the impact-resistant primer coating, after curing, typically ranges from 0.05 to 30 µm, preferably 0.2 to 20 µm and more particularly from 0.5 to 10 µm, and even better 0.6 to 5 µm or 0.6 to 3 µm, and most preferably 0.8 to 1.5 µm.

The impact-resistant primer coating is preferably in direct contact with an abrasion- and/or scratch-resistant coating. In one embodiment, its refractive index ranges from 1.45 to 1.55. In another embodiment, its refractive index is higher than or equal to 1.55.

The abrasion- and/or scratch-resistant coating may be any layer traditionally used as an anti-abrasion and/or anti-scratch coating in the field of optical lenses.

The abrasion- and/or scratch-resistant coatings are preferably hard coatings based on poly(meth)acrylates or silanes, generally comprising one or more mineral fillers intended to increase the hardness and/or the refractive index of the coating once cured.

Abrasion- and/or scratch-resistant coatings are preferably prepared from compositions comprising at least one alkoxysilane and/or a hydrolyzate thereof, obtained for example through hydrolysis with a hydrochloric acid solution and optionally condensation and/or curing catalysts.

Suitable coatings that are recommended for the present invention include coatings based on epoxysilane hydrolyzates such as those described in the patents EP 0614957, U.S. Pat. Nos. 4,211,823 and 5,015,523.

A preferred abrasion- and/or scratch-resistant coating composition is the one disclosed in the patent EP 0614957, in the name of the applicant. It comprises a hydrolyzate of epoxy trialkoxysilane and dialkyl dialkoxysilane, colloidal silica and a catalytic amount of an aluminum-based curing catalyst such as aluminum acetylacetonate, the rest being essentially composed of solvents traditionally used for formulating such compositions. Preferably, the hydrolyzate used is a hydrolyzate of γ-glycidoxypropyltrimethoxysilane (GLYMO) and dimethyldiethoxysilane (DMDES).

The abrasion- and/or scratch-resistant coating composition may be deposited by known methods and is then cured, preferably using heat or ultraviolet radiation. The thickness of the (cured) abrasion- and/or scratch-resistant coating does generally vary from 2 to 10 μm, preferably from 3 to 5 μm.

The optical article according to the invention may also comprise coatings formed on the antireflection coating and capable of modifying the surface properties thereof, such as a hydrophobic and/or oleophobic coating (antifouling top coat). These coatings are preferably deposited onto the outer layer of the antireflection coating. Generally, their thickness is lower than or equal to 10 nm, does preferably range from 1 to 10 nm, more preferably from 1 to 5 nm. Antifouling top coats are generally coatings of the fluorosilane or fluorosilazane type, preferably comprising fluoropolyether moieties and more preferably perfluoropolyether moieties. More detailed information on these coatings is disclosed in WO 2012/076714.

Instead of a hydrophobic coating, a hydrophilic coating may be used which provides anti-fog properties (anti-fog coating), or a precursor of an anti-fog coating which provides anti-fog properties when associated with a surfactant. Examples of such anti-fog precursor coatings are described in the patent application WO 2011/080472.

The additional coatings such as primers, hard coats and antifouling top coats may be deposited onto a main face of the substrate using methods known in the art, including spin-coating, dip-coating, spray-coating, evaporation, sputtering, chemical vapor deposition and lamination.

Typically, an optical article according to the invention comprises a substrate that is successively coated with an impact-resistant primer layer, an anti-abrasion and/or scratch-resistant layer, optional sheets (A) to (C), an optional sub-layer, an antireflection coating according to the invention, and a hydrophobic and/or oleophobic coating, or a hydrophilic coating which provides anti-fog properties, or an anti-fog precursor coating.

In one embodiment, the antireflection coating, optional sheets (A) to (C) and the optional sub-layer are applied on the front main face of the lens and/or the rear main face of the lens, preferably the front main face of the lens.

In another embodiment, the antireflection coating, optional sheets (A) to (C) and the optional sub-layer are applied on the front main face of the lens (or the back main face), and the back main face of the lens (or the front main face) is coated with an antireflection coating, which is identical to or different from the antireflection coating of the other face, optionally with a sub-layer, which is identical to or different from the sub-layer of the other face, optionally with sheets (A) to (C), which are identical to or different from sheets (A) to (C) of the other face, and optionally with an impact resistant primer coating and/or an abrasion- and/or scratch-resistant coating, which are identical to or different from those of the other face. Obviously, the layers of the back face are stacked in an order that is similar to the front face.

The present antireflection coating is a filter for at least part of the blue light, working by reflection of said light. Thus, an optical lens of the invention, provided with this reflection filter, reduces the phototoxic blue light global transmission to the retina of a user wearing such an optical lens by at least partially blocking its transmission.

The antireflection coating according to the invention shows a reflection band in the UV-blue-violet range of light, so as to reflect and thus inhibit transmission of high energy visible light and near UV light, and in particular harmful blue light in the range 420 nm-450 nm (preferably 420-460 nm). This is particularly interesting when the coating is positioned on the front face of the lens.

The reflection properties of blue light, typically in the 420-450 nm range or the 440-460 nm range, can be provided to the optical lens by a single antireflection coating according to the invention present on at least one of its main faces, preferably the front main face, or by two identical or different antireflection coatings according to the invention present on both main faces of the lens, or by one antireflection coating according to the invention present on one main face and another coating not according to the invention present on the other main face. In the two latter cases, both antireflection coatings on the main faces of the lens contribute to reflecting harmful blue light and transmitting visible light at other wavelengths. Preferably, the antireflection coating that is the most efficient in terms of reflecting blue light ($R_m^{B1}$), if different antireflection coatings are used on both main faces, is present on the front main face.

In a preferred embodiment of the invention, the invention relates to an optical lens comprising a substrate having a front main face and a rear main face, at least one of the main faces of the optical lens comprising a multilayer antireflection coating having a stack of at least one high refractive index layer with a refractive index higher than 1.55 and at least one low refractive index layer with a refractive index of 1.55 or less, which provides said at least one main face with the following properties:

an average blue light reflection factor $R_m^{B1}$ within a wavelength range of from 420 nm to 450 nm, which is higher than or equal to 17%, for an angle of incidence ranging from 0° to 15°, and an average blue light reflection factor $R_m^{B2}$ within a wavelength range of from 465 nm to 495 nm, lower than or equal to 5%, for an angle of incidence ranging from 0° to 15°, and/or an average blue light reflection factor $R_m^{B3}$ within a wavelength range of from 440 nm to 460 nm, higher than or equal to 10%, for an angle of incidence ranging from 0° to 15°.

In this embodiment of the invention, the reflection properties of blue light are defined for the main face of the optical lens onto which the antireflection coating is deposited.

The multilayer antireflection coating(s) present on the main face(s) provide(s) the optical lens (preferably, the multilayer antireflection coating provides the at least one main face of the lens onto which it is deposited) with an average (or mean) blue light reflection factor $R_m^{B1}$ within a wavelength range of from 420 nm to 450 nm that is higher than or equal to 17%, for an angle of incidence on the main face comprising the filter ranging from 0° (normal incidence) to 15°, preferably 15°. It is defined by the formula:

$$R_{mB1} = \frac{\int_{420}^{450} R(\lambda)d\lambda}{450-420}$$

wherein R(λ) represents the reflection factor at a given wavelength A. $R_m^{B1}$ is defined for a specific angle of incidence, based on R(λ) measured at the same angle of incidence.

The mean reflection factor $R_m^{B1}$ as defined above is preferably higher than or equal to any one of the following values: 18, 20, 25, 30, 35, 40%.

The present filter is especially designed to maximize the average blue light reflection factor $R_m^{B1}$. This makes it possible to maximize the rejection of phototoxic blue light, within the wavelength range of from 420 nm to 450 nm, directly arriving on the front main face of the lens, by depositing the filter preferably on said front face. It is considered herein that the major part of the direct light originating from the front of a lens wearer and reaching the retina of the same has a low incidence on the front main face, generally ranging from 0° to 15°.

Unless otherwise specified, transmittances and reflection factors are an average of light transmitted or reflected within the range that is not weighted according to the sensitivity of the eye at each wavelength of the range. In the present description, unless otherwise specified, transmittances/ transmissions are measured at the center of the optical article for a thickness ranging from 0.5 to 2.5 mm, preferably 2 mm, at an angle of incidence ranging from 0° to 15°, preferably 0°.

The angle of incidence is classically defined as the angle between the perpendicular to the surface at the point of incidence and the direction of the light beam striking this surface.

In another embodiment, the antireflection coating according to the invention has a limited reflection of the part of blue light known as chronobiologic blue light responsible for the synchronization of the biological clock (in the range of 465 nm to 495 nm), so as to allow a sufficient amount of this light to reach the eyes of the wearer and not to disturb their circadian rhythm.

It may be particularly desirable in some cases to selectively filter a relatively small portion of the blue light spectrum, i.e., within the 380-450 nm region, preferably the 420 nm-450 nm or 420 nm-460 nm region, while preserving the ability to transmit neighboring wavelengths. Indeed, it has been found that blocking too much of the blue spectrum can interfere with scotopic vision and mechanisms for regulating biorhythms, referred to as "circadian cycles". Thus, in a preferred embodiment, the antireflection coating blocks less than 10 or 5% of light having a wavelength ranging from 465 to 495 nm. In this embodiment, the antireflection coating selectively blocks the phototoxic blue light and efficiently transmits the blue light implicated in circadian rhythms. Preferably, the antireflection coating transmits at least 80, 85 or 90% of light having a wavelength ranging from 465 to 495 nm (for an angle of incidence on the main face ranging from 0° to 15°). In another embodiment, the antireflection coating does not absorb light in the 465-495 nm range. These requirements are also preferably satisfied by the corresponding optical lens.

In a preferred embodiment, the multilayer antireflection coating(s) present on the main face(s) provide(s) the optical lens (preferably, the multilayer antireflection coating provides the at least one main face of the lens onto which it is deposited) with an average (or mean) blue light reflection factor $R_m^{B2}$ within a wavelength range of from 465 nm to 495 nm that is lower than or equal to 5%, for an angle of incidence on the main face comprising the filter ranging from 0° to 15°, preferably 15°. It is defined by the formula:

$$R_{mB2} = \frac{\int_{465}^{495} R(\lambda)d\lambda}{495 - 465}$$

wherein R(λ) represents the reflection factor at a given wavelength λ. $R_m^{B2}$ is defined for a specific angle of incidence, based on R(λ) measured at the same angle of incidence.

The mean reflection factor $R_m^{B2}$ as defined above is preferably lower than or equal to any one of the following values: 4, 3, 2.5, 2, 1.5, 1%.

According to this embodiment, the antireflection coating of the invention has an outstanding selectivity, which enables to protect from the phototoxic blue light band, while preserving at best the circadian cycles by not disturbing the chronobiologic blue light band. Preferably, $R_m^{B2}$ is lower than $R_m^{B1}$, more preferably at least twice lower.

Preferably, the optical lens transmission factor at 480 nm for an angle of incidence on the main face ranging from 0° to 15° is higher than or equal to 70%, more preferably higher than or equal to 90%, and even more preferably higher than or equal to 95%.

In a preferred embodiment, the antireflection coating according to the invention at least partially reflects LED blue light emitted by digital devices around 450 nm.

In a preferred embodiment, the multilayer antireflection coating(s) present on the main face(s) provide(s) the optical lens (preferably, the multilayer antireflection coating provides the at least one main face of the lens onto which it is deposited) with an average (or mean) blue light reflection factor $R_m^{B3}$ within a wavelength range of from 440 nm to 460 nm that is higher than or equal to 10%, for an angle of incidence on the main face comprising the filter ranging from 0° to 15°, preferably 15°. It is defined by the formula:

$$R_{mB3} = \frac{\int_{440}^{460} R(\lambda)d\lambda}{460 - 440}$$

wherein R(λ) represents the reflection factor at a given wavelength λ. $R_m^{B3}$ is defined for a specific angle of incidence, based on R(λ) measured at the same angle of incidence.

The mean reflection factor $R_m^{B3}$ as defined above is preferably higher than or equal to any one of the following values: 12, 15, 17, 20%. Ideally, the mean reflection factor $R_m^{B3}$ ranges from 15 to 25%.

In this embodiment, the present filter is especially designed to maximize the average blue light reflection factor $R_m^{B3}$. This makes it possible to maximize the rejection of phototoxic blue light, within the wavelength range of from 440 nm to 460 nm, directly arriving on the front main face of the lens, by depositing the filter preferably on said front face, and thus to increase visual comfort and decrease eyestrain favored by a prolonged usage of LED-based digital devices.

In one of its aspects, the present invention is aimed at using the optical lens of the invention for a therapeutic purpose or to prevent diseases related to blue light-induced phototoxicity (day light and LED light), to reduce the risks of occurrence of an ophthalmic disease due to a degenerative process related to the phototoxic blue light, or to protect against the blue light-induced phototoxicity at least part of the wearer's eye, in particular against a degenerative process such as age-related macular degeneration (ARMD). An optical lens such as described herein does also advantageously provide the wearer with an improved visual contrast.

Generally, the average blue light reflection factor $R_m^{B1}$ within a wavelength range of from 420 nm to 450 nm, for an angle of incidence ranging from 0° to 15° (preferably) 15°, is higher than the average blue light reflection factor $R_m^{B3}$ within a wavelength range of from 440 nm to 460 nm, for an angle of incidence ranging from 0° to 15° (preferably) 15°.

In the present application, the spectral reflectivity of the optical lens, for a given angle of incidence of the face comprising the filter, represents the variation of the reflectivity (i.e., reflection factor) at this angle of incidence depending on the wavelength. The reflectivity curve/spectrum does correspond to a schematic illustration of the reflectivity, in which reflectivity is plotted as ordinate and wavelength as abscissa. The reflectivity may be measured by means of a spectrophotometer, for example a spectrophotometer Perkin Elmer Lambda 850 fitted with URA (Universal Reflectance Accessory), which provides a reflection spectrum.

In one embodiment, the spectral reflectivity curve of said multilayer antireflection coating for an angle of incidence ranging from 0° to 15° has a reflection peak centered at a wavelength higher than or equal to 330, 350, 360 or 370 nm and lower than or equal to 410 nm, more preferably lower than or equal to 400 or 390 nm. Preferably, the spectral reflectivity curve of said multilayer antireflection coating for an angle of incidence ranging from 0° to 15° has a maximum reflectivity at a wavelength higher than or equal to 330, 350, 360 or 370 nm and lower than or equal to 410 nm, more preferably lower than or equal to 400 or 390 nm. It is thus shifted as compared to the central wavelength (435 nm) of the wavelength band between 420 nm and 450 nm of phototoxic blue light.

As used herein, having a reflection peak in a range of wavelengths means that the maximum of the peak falls within this range.

In another embodiment, said reflection peak exhibits a full width at half maximum (FWHM) lower than 150 nm, preferably lower than 120 or 110 nm. The FWHM of said reflection peak preferably exhibits a full width at half maximum higher than 70, 80, 90 or 100 nm. Having a broader reflection peak efficiently prevents transmission of harmful blue light over a broader spectral range.

Figure 3:
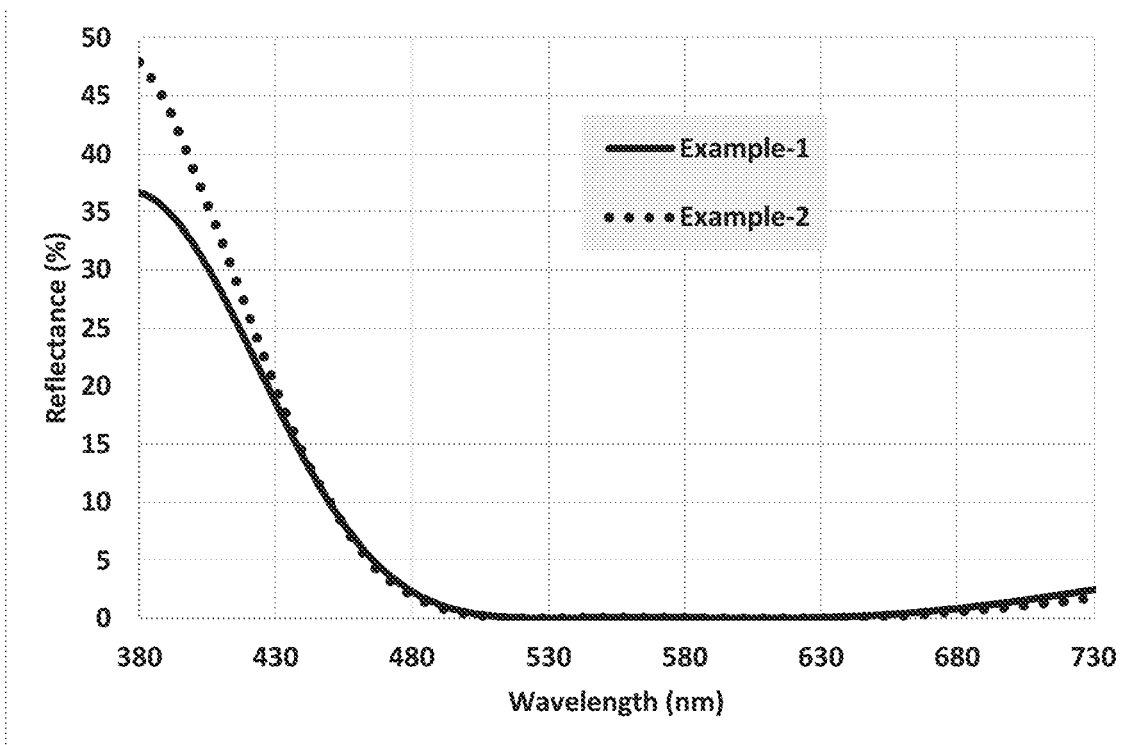
FIGS. 3-13 depict reflection curves between 380 and 780 nm for the filtering antireflection coatings present on the front main face of the lenses of the examples and comparative examples, for an angle of incidence of 15°.
Figure 4:
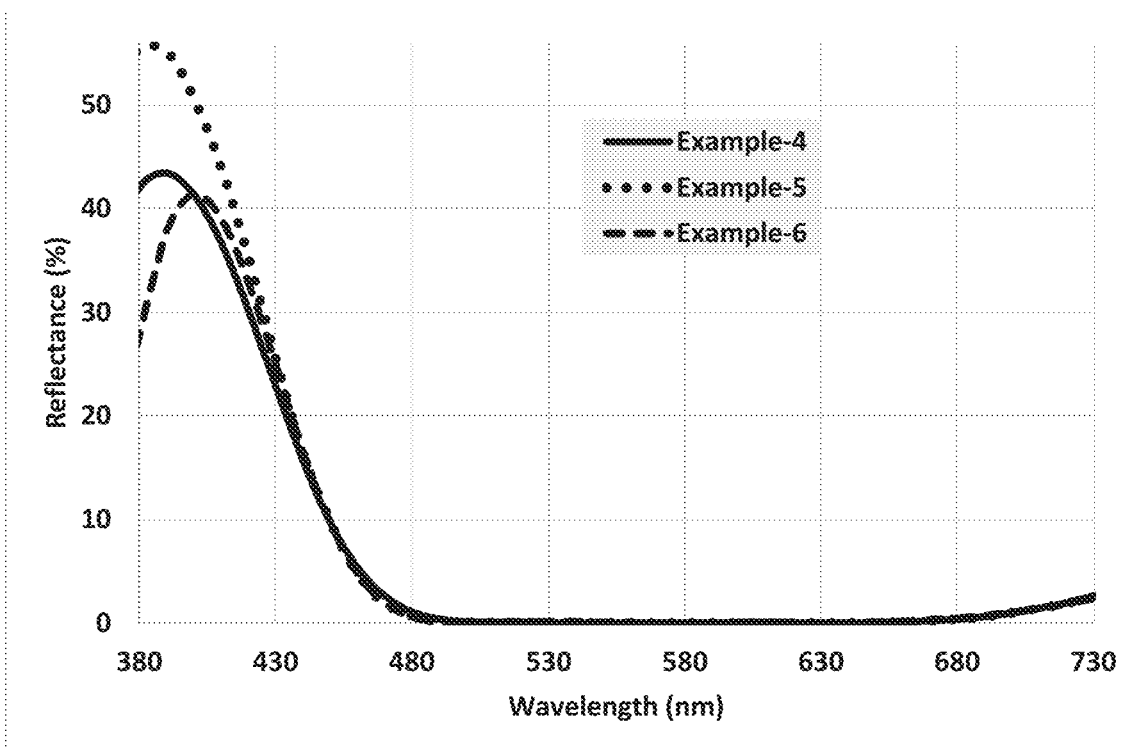
Figure 5:
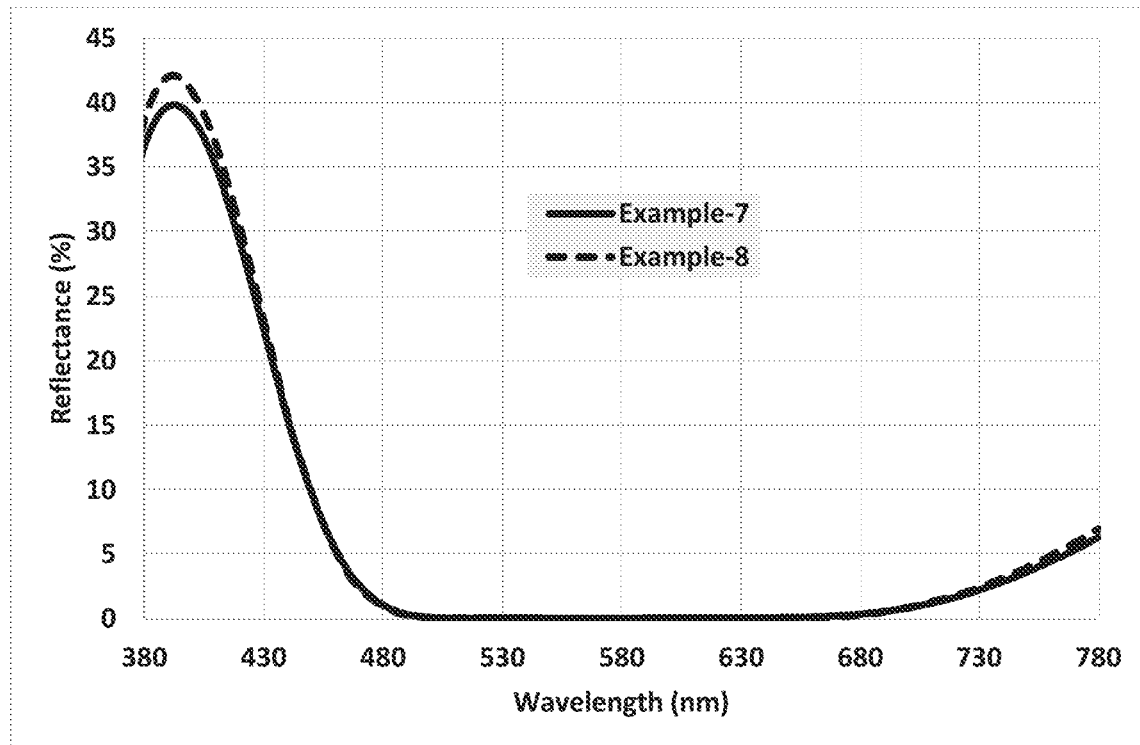
Figure 6:
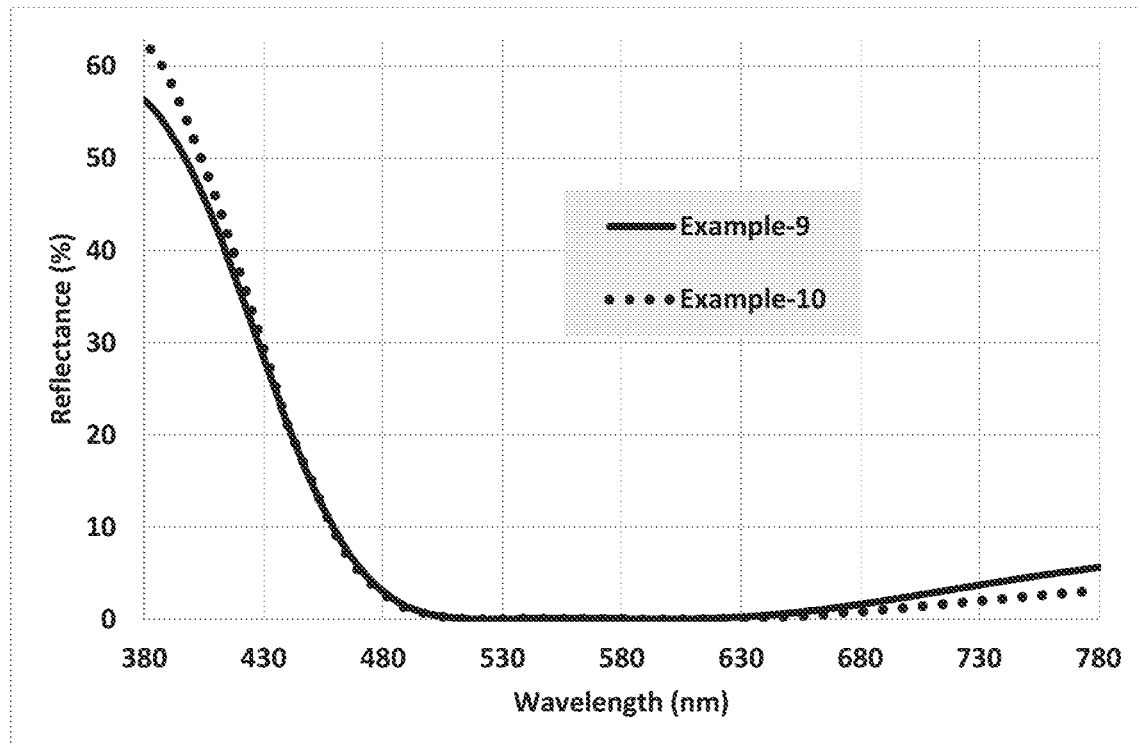
Figure 7:
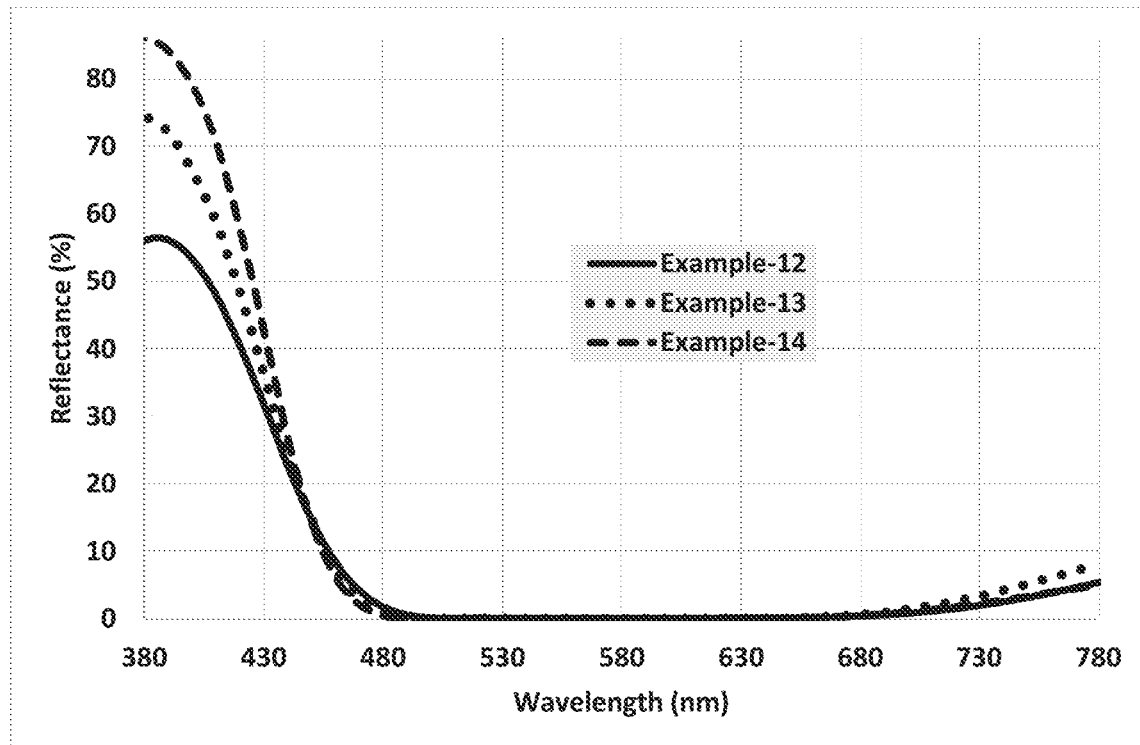
Figure 8:
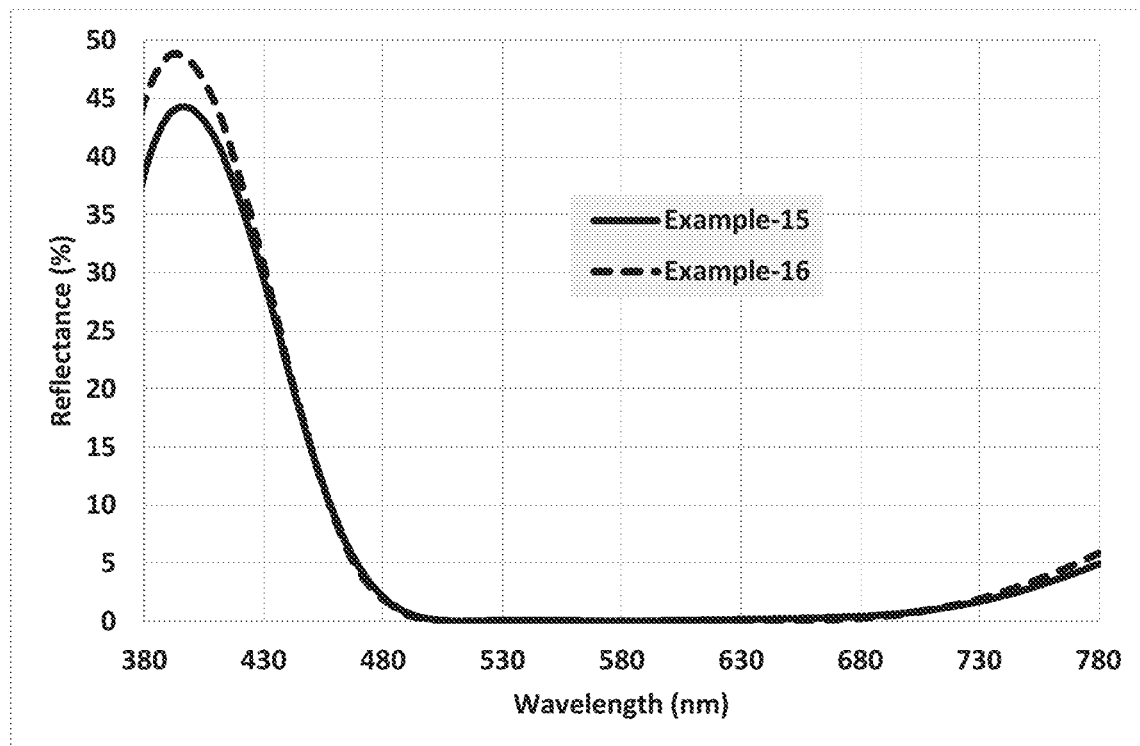
Figure 9:
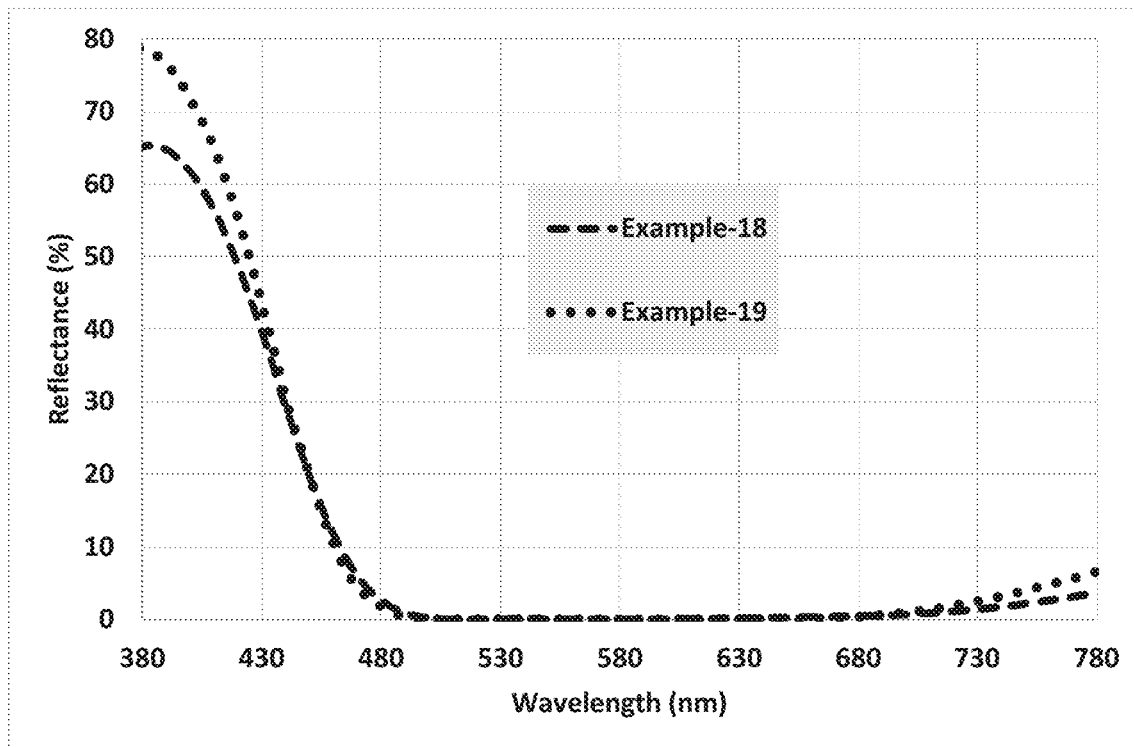
Figure 10:
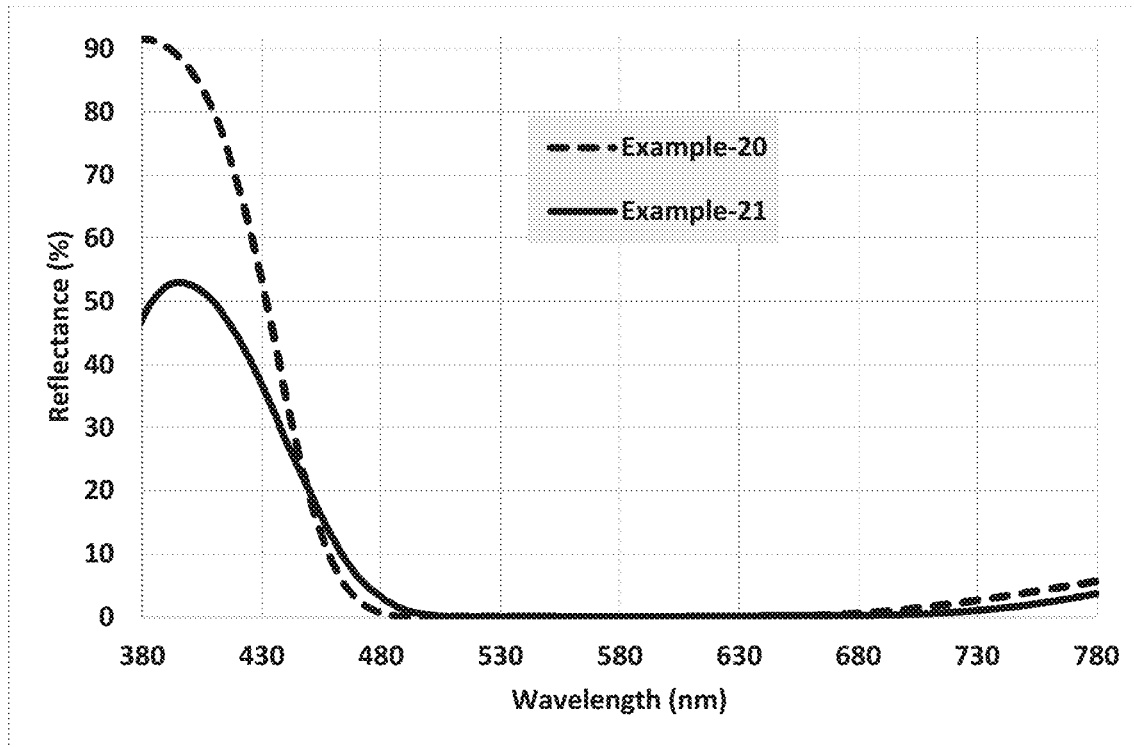

As can be seen on FIGS. 3-10, the spectral reflectivity curves of the lenses of the invention, generally have, within the wavelength range of from 330 nm to 500 nm, a "bell form" which can be characterized through its height (maximum reflectivity) and its full width at half maximum (FWHM).

The full width at half maximum is a well-known measure of bandwidth for filters. Its definition is $\lambda_{high}-\lambda_{low}$, where $\lambda_{high}$ and $\lambda_{low}$ occur on each side of the reflection peak wavelength, where the reflection is (maximum peak reflection–baseline reflection)/2. The maximum reflection of a filter defines the center of the band filter.

In this embodiment of the invention (FWHM>70 nm), the present antireflection filter is a broad band filter or high pass filter, preferably in the 380-495 nm range. A high-pass filter attenuates transmission of light wavelengths below a cutoff wavelength, allowing higher light wavelengths to pass through the filter.

Generally speaking, filters may be designed to be "narrow", highly selective, having a limited bandpass and a peak in reflectivity centered on this bandpass. For limiting the phototoxic blue light transmission to the retina, a suitable narrow-band filter should thus have for example a full width at half maximum of 30 nm between 420 nm and 450 nm, and a maximum reflectivity for the wavelength around the center of 435 nm.

In practice, highly selective, narrow-band filters are typically composed of an overall thick stack, and/or comprise a high number of dielectric layers.

Such filters require a long and expensive industrial manufacturing process, especially when deposited under vacuum. Increasing the number of layers and the number of interfaces makes it also difficult to obtain good mechanical properties.

Taking the hereabove mentioned constraints into account leads to limit the number of layers, but narrow-band reflection filters comprising a limited number of layers and a thickness compatible with a large-scale industrial production suffer from a reduced performance in terms of spectral selectivity, and are likely to reflect a significant part of the light within the circadian cycle-governing range.

The present filter having a reflection peak with a higher full width at half maximum as compared to a narrow-band filter, proves to be thinner than a narrow-band filter of the same blue light cut efficiency, and has not so many layers, and, as a consequence, is easier and cheaper to produce.

In one embodiment, the optical article according to the invention does not absorb in the visible or not much, which means, in the context of the present application, that its relative light transmission factor in the visible spectrum Tv is higher than or equal to any one of the following values: 87%, 88%, 89%, 90%, 92%, 95%, 96%, 97%, 98%. Said Tv factor preferably ranges from 87% to 98.5%, more preferably from 87% to 97%, even better from 87% to 96%. In another embodiment, Tv ranges from 89% to 98%, preferably from 90% to 98%, better 95% to 97%.

The Tv factor, also called "luminous transmission" of the system, is such as defined in ISO standard 13666:1998 and is measured accordingly to standard ISO 8980-3. It is defined as the average in the 380-780 nm wavelength range that is weighted according to the sensitivity of the eye at each wavelength of the range and measured under D65 illumination conditions (daylight).

Since the present antireflection selectively reflects a narrow range of blue light, it exhibits a very low mean light reflection factor $R_v$ between 380 nm and 780 nm. The "mean light reflection factor," noted $R_v$, also called "luminous reflection", is such as defined in the ISO 13666:1998 standard, and measured in accordance with the ISO 8980-4 standard (for an angle of incidence ranging from 0° to 15°, typically of) 15°, i.e., this is the weighted spectral reflection average over the whole visible spectrum between 380 and 780 nm. It may be measured for all incidence angles θ, thus defining a function $R_v(\theta)$.

The mean light reflection factor $R_v$ of the face of the lens coated by the antireflection coating according to the invention is lower than or equal to 0.5%, and preferably lower than or equal to any one of the following values: 0.4, 0.3, 0.25%, for an angle of incidence ranging from 0° to 15°, preferably 15°.

In one embodiment, said mean light reflection factor $R_v$ for an angle of incidence of 15° of the face of the lens coated by the antireflection coating according to the invention is higher than the mean light reflection factor $R_v$ for an angle of incidence of 35° for the same face. This is beneficial for minimizing backward glare.

According to an embodiment of the invention, the mean light reflection factor as a function of incident angle $R_v(\theta)$ on said at least one main face has a minimum value $R_{vmin}$ for an angle of incidence $\theta_{min}$ comprised in the range [20°-50°] and $R_{vmin}/R_v(15°)<0.8$, preferably $R_{vmin}/R_v(15°)<0.75$, 0.7 or 0.65, $R_v(15°)$ being the mean light reflection factor for an angle of incidence $\theta$ of 15° on said at least one main face, defined in the ISO 13666:1998 standard.

When this requirement is satisfied, an aesthetic improvement and anti-glare improvement are obtained: the optical lenses of the invention are especially adapted to reduce reflection of visible light coming from all directions, i.e., over a wide range of angles of incidence on the optical lens. It is particularly interesting to have an antireflection coating having low reflection $R_v(\theta)$ on a broad angular range, typically [0°-45°] and preferably [0°-50°]. In the case of an ophthalmic lens, both the wearer and observer benefit from this improvement.

From the observer's point of view, the benefits of multi-angular efficiency are mainly aesthetic. The front and side mirror effect are decreased, leading to the ability to have a better vision of the eyes of the wearer whether the observer is located in front of the wearer or on a lateral position. The observer is also less troubled by reflections when moving from one side of the wearer to the other.

From the wearer's point of view, decreasing reflection of light rays comprised in an incident angle range of [30°-45°] is crucial, as light having such angles of incidence generates reflection from the back side of the lens and discomfort.

The colorimetric coefficients C* and h of the antireflective coating of the invention in the international colorimetric CIE L*a*b* are calculated between 380 and 780 nm, taking the standard illuminant D65 and the observer into account, for light having an angle of incidence of 15°, in reflection. The observer is a "standard observer" (10°) as defined in the international colorimetric system CIE L*a*b*.

The hue angle (h) of the antireflection coating relates to the residual color displayed by said antireflection coating (color of the reflected light), and preferably ranges from 240° to 325°, preferably from 300° to 320°, thus resulting in a perceived residual reflected color blue to violet.

The colorimetric coefficients of the lenses of the invention have a good robustness. The robustness ơh of the optical article, defined in WO 2015/000534, is satisfactory, and preferably lower than or equal to 8°, more preferably lower than or equal to 3°.

The invention further relates to a method of manufacturing an optical lens such as described hereabove, comprising:
providing an optical lens comprising a substrate having a front main face and a rear main face,
depositing onto at least one main face of the substrate, in this order, optionally a first high refractive index sheet (A) having a refractive index higher than 1.55, which does not comprise any $Ta_2O_5$ layer, optionally a second low refractive index sheet (B) having a refractive index of 1.55 or less so that it is in direct contact with the former sheet (A), optionally a third high refractive index sheet (C) having a refractive index higher than 1.55 so that it is in direct contact with the former sheet (B), optionally a monolayer sub-layer having an exposed surface and a thickness higher than or equal to 140 nm so that it is in direct contact with the former sheet (C), and a multilayer antireflection coating comprising a stack of at least one high refractive index layer having a refractive index higher than 1.55 and at least one low refractive index layer having a refractive index of 1.55 or less, thereby obtaining a coated optical article, and
the multilayer antireflection coating(s) present on the main face(s) of the substrate provide(s) the optical lens with an average blue light reflection factor $R_m^{B1}$ within a wavelength range of from 420 nm to 450 nm, which is higher than or equal to 17%, for an angle of incidence ranging from 0° to 15°, and the multilayer antireflection coating provides said at least one main face with a mean light reflection factor $R_v$ between 380 nm and 780 nm, defined in the ISO 13666:1998 standard, lower than or equal to 0.5%, preferably lower than or equal to 0.3%, for an angle of incidence ranging from 0° to 15°.

In one embodiment, the present optical lens is prepared by forming on the substrate a primer coating and/or an abrasion- and/or scratch-resistant coating in a first manufacturing site, while the other coatings are formed in a second manufacturing site.

The following examples illustrate the present invention in a more detailed, but non-limiting manner. Unless stated otherwise, all thicknesses disclosed in the present application relate to physical thicknesses. The percentages given in the tables are weight percentages. Unless otherwise specified, the refractive indexes referred to in the present invention are expressed at 20-25° C. for a wavelength of 550 nm.

The preferred angle of incidence for each optical parameter is 15°. A study conducted to analyze the incidence range of light in typical screen usage situations on ophthalmic lens wearers revealed that 68% of the light emitted from screen/digital devices reaches the lens in the incident angular range [10°-30°], and 95% of the light comes at an incidence below 36°. Therefore, the 15° incident angle is a relevant incidence to consider for light emitted by screen devices.

EXAMPLES

1. General Procedures

The articles employed in the examples comprise a 65 mm-diameter polythiourethane MR8® lens substrate (from Mitsui Toatsu Chemicals Inc., refractive index=1.59), with a power of −2.00 diopters and a thickness of 1.2 mm, coated on its convex main face with the impact resistant primer coating disclosed in the experimental part of WO 2010/109154 modified to have a refractive index of 1.6 by addition of high refractive index colloids, and the abrasion- and scratch-resistant coating (hard coat) disclosed in example 3 of EP 0614957 (modified to have a refractive index of 1.6 rather than 1.5 by adding high refractive index colloids), optional impedance layers such as sheets (A), (B) and (C), optionally a sub-layer, a multilayer filtering antireflection coating according to the invention, and the antifouling coating disclosed in the experimental section of patent application WO 2010/109154, i.e., by evaporation under vacuum of the Optool DSX® compound marketed by Daikin Industries (thickness: from 2 to 5 nm).

The various dielectric layers were deposited without heating the substrates, by vacuum evaporation, optionally assisted (IAD) during the deposition by a beam of oxygen and possibly argon ions, when specified (evaporation source: electron gun), and optionally under pressure regulation by supplying (passive) $O_2$ gas into the chamber, where indicated.

The vacuum evaporation device that made it possible to deposit the various antireflective layers was a vacuum coater BAK from Physimeca having two systems for evaporating materials, an electron gun evaporation system, a thermal evaporator (Joule-effect evaporation system), and a Mark 2+ ion gun from Veeco for use in the preliminary phase of preparation of the surface of the substrate by argon ion bombardment (IPC) and in the ion-assisted deposition (IAD) of the layers.

2. Preparation of the Optical Articles

The lenses were placed on a carrousel provided with circular openings intended to accommodate the lenses to be treated, the concave side facing the evaporation sources and the ion gun.

The method for producing optical articles comprises introducing the lens substrate provided with the primer and abrasion-resistant coatings into a vacuum deposition chamber, conducting a pumping step until a high vacuum was created, and then applying the same treatment conditions as in WO 2020/104392 for successively evaporating the required number of layers (sub-layer, antireflection coating layers, antifouling coating, etc.).

3. Testing Methods

The following test procedures were used to evaluate the optical articles prepared according to the present invention. Several samples for each system were prepared for measurements and the reported data were calculated with the average of the different samples.

Colorimetric measurements of hue angle h for the face coated with the stack of the invention were carried out with a Zeiss spectrophotometer in the international colorimetric CIE (L*, a*, b*) space, taking into account the standard illuminant D65, and the standard observer 10°. They are provided for an angle of incidence of 15°, in reflection.

$R_v$, $R_m^{B1}$, $R_m^{B2}$ and $R_m^{B3}$ were computed from the same measurement, in reflection, for an angle of incidence of 15°.

4. Results

The structural characteristics and the optical performances of the ophthalmic lenses obtained in the examples are detailed hereunder. The sub-layer is gray-colored. The total thickness mentioned is the thickness of the stack comprising the antireflection coating and the following additional layers, when present (*): sub-layer, sheets (A), (B) and (C).

Comparative examples 1 and 2 present antireflection coatings prepared according to the teaching of WO 2013/171434. Comparative examples 6, 7 and 8 present antireflection coatings prepared according to the teaching of US 2016/154254. Comparative example 9 presents an antireflection coating prepared according to the teaching of WO 2012/076714.

| Example 1 Substrate + primer/hard coat | |
|---|---|
| $ZrO_2$ | 13.1 nm |
| $SiO_2$ | 100.6 nm |
| $ZrO_2$ | 21.2 nm |
| $SiO_2$ | 58.4 nm |
| $ZrO_2$ | 71.1 nm |
| $SnO_2$ | 6.5 nm |
| $SiO_2$ | 101.6 nm |

| Top coat | |
|---|---|
| $R_{T1}$ | 2.33 |
| $Rm^{B1}$ (%) | 16.36 |
| $Rm^{B2}$ (%) | 2.55 |
| $Rm^{B3}$ (%) | 10 |
| $R_v(15°)$ (%) | 0.33 |
| $R_v(35°)$ (%) | 0.30 |
| h (°) | 311 |
| $R_{vmin}/R_v(15°)$ | 0.75 |
| Total thickness | 372.4 nm |

| Example 2 Substrate + primer/hard coat | |
|---|---|
| $Ta_2O_5$ | 9 nm |
| $SiO_2$ | 83.8 nm |
| $Ta_2O_5$ | 29.3 nm |
| $SiO_2$ | 40.3 nm |
| $Ta_2O_5$ | 66.8 nm |
| $SnO_2$ | 6.5 nm |
| $SiO_2$ | 102.2 nm |

| Top coat | |
|---|---|
| $R_{T1}$ | 2.03 |
| $Rm^{B1}$ (%) | 17.31 |
| $Rm^{B2}$ (%) | 2.21 |
| $Rm^{B3}$ (%) | 10 |
| $R_v(15°)$ (%) | 0.30 |
| $R_v(35°)$ (%) | 0.28 |
| h (°) | 312 |
| $R_{vmin}/R_v(15°)$ | 0.75 |
| Total thickness | 337.9 nm |

| Example 4 Substrate + primer/hard coat | |
|---|---|
| $ZrO_2$ | 37.4 nm |
| $SiO_2$ | 22.5 nm |
| $ZrO_2$ | 70.5 nm |
| $SiO_2$ | 106.2 nm |
| $ZrO_2$ | 5.8 nm |
| $SiO_2$ | 81.2 nm |
| $ZrO_2$ | 67.8 nm |
| $SnO_2$ | 6.5 nm |
| $SiO_2$ | 97.8 nm |

| Top coat | |
|---|---|
| $R_{T1}$ | 1.64 |
| $Rm^{B1}$ (%) | 19.48 |
| $Rm^{B2}$ (%) | 1.41 |
| $Rm^{B3}$ (%) | 10 |
| $R_v(15°)$ (%) | 0.24 |
| $R_v(35°)$ (%) | 0.22 |
| h (°) | 314 |
| $R_{vmin}/R_v(15°)$ | 0.71 |
| Total thickness | 495.6 nm |

| Example 5 Substrate + primer/hard coat | |
|---|---|
| $Ta_2O_5$ | 26.1 nm |
| $SiO_2$ | 46.1 nm |
| $Ta_2O_5$ | 33.7 nm |
| $SiO_2$ | 133.1 nm |
| $Ta_2O_5$ | 14.3 nm |
| $SiO_2$ | 47.9 nm |
| $Ta_2O_5$ | 68.1 nm |
| $SnO_2$ | 6.5 nm |
| $SiO_2$ | 97 nm |

| Top coat | |
|---|---|
| $R_{T1}$ | 2.18 |
| $Rm^{B1}$ (%) | 21.37 |
| $Rm^{B2}$ (%) | 1.0 |
| $Rm^{B3}$ (%) | 10 |
| $R_v(15°)$ (%) | 0.24 |
| $R_v(35°)$ (%) | 0.23 |
| h (°) | 314 |
| $R_{vmin}/R_v(15°)$ | 0.73 |
| Total thickness* | 472.6 nm |

-continued

Example 6
Substrate + primer/hard coat

| | |
|---|---|
| $TiO_2$ | 13.3 nm |
| $SiO_2$ | 68.7 nm |
| $TiO_2$ | 15.8 nm |
| $SiO_2$ | 111.2 nm |
| $TiO_2$ | 18.9 nm |
| $SiO_2$ | 31 nm |
| $TiO_2$ | 87.4 nm |
| $SnO_2$ | 6.5 nm |
| $SiO_2$ | 90.5 nm |

Top coat

| | |
|---|---|
| $R_{T1}$ | 2.12 |
| $Rm^{B1}$ (%) | 20.86 |
| $Rm^{B2}$ (%) | 0.96 |
| $Rm^{B3}$ (%) | 10 |
| $R_v(15°)$ (%) | 0.25 |
| $R_v(35°)$ (%) | 0.22 |
| h (°) | 314 |
| $R_{vmin}/R_v(15°)$ | 0.68 |
| Total thickness | 443.2 nm |

Example 7
Substrate + primer/hard coat

| | |
|---|---|
| $ZrO_2$ | 35.5 nm |
| $SiO_2$ | 32 nm |
| $ZrO_2$ | 55 nm |
| $SiO_2$ | 150 nm |
| $ZrO_2$ | 3.6 nm |
| $SiO_2$ | 56.4 nm |
| $ZrO_2$ | 66.9 nm |
| $SnO_2$ | 6.5 nm |
| $SiO_2$ | 97.3 nm |

Top coat

| | |
|---|---|
| $R_{T1}$ | 2 |
| $Rm^{B1}$ (%) | 19.04 |
| $Rm^{B2}$ (%) | 1.39 |
| $Rm^{B3}$ (%) | 10 |
| $R_v(15°)$ (%) | 0.24 |
| $R_v(35°)$ (%) | 0.23 |
| h (°) | 314 |
| $R_{vmin}/R_v(15°)$ | 0.73 |
| Total thickness* | 503 nm |

Example 8
Substrate + primer/hard coat

| | |
|---|---|
| $ZrO_2$ | 37.9 nm |
| $SiO_2$ | 30.9 nm |
| $ZrO_2$ | 51.2 nm |
| $SiO_2$ | 150 nm |
| $Ta_2O_5$ | 11.6 nm |
| $SiO_2$ | 43.4 nm |
| $Ta_2O_5$ | 61.3 nm |
| $SnO_2$ | 6.5 nm |
| $SiO_2$ | 98.1 nm |

Top coat

| | |
|---|---|
| $R_{T1}$ | 1.78 |
| $Rm^{B1}$ (%) | 19.56 |
| $Rm^{B2}$ (%) | 1.27 |
| $Rm^{B3}$ (%) | 10 |
| $R_v(15°)$ (%) | 0.23 |
| $R_v(35°)$ (%) | 0.22 |
| h (°) | 314 |
| $R_{vmin}/R_v(15°)$ | 0.72 |
| Total thickness* | 490.9 nm |

Example 9
Substrate + primer/hard coat

| | |
|---|---|
| $ZrO_2$ | 29.3 nm |
| $SiO_2$ | 70.6 nm |
| $ZrO_2$ | 31.8 nm |
| $SiO_2$ | 70.7 nm |
| $ZrO_2$ | 55.5 nm |
| $SnO_2$ | 6.5 nm |
| $SiO_2$ | 110.6 nm |

Top coat

| | |
|---|---|
| $R_{T1}$ | 2.05 |
| $Rm^{B1}$ (%) | 24.92 |
| $Rm^{B2}$ (%) | 3.41 |
| $Rm^{B3}$ (%) | 15 |
| $R_v(15°)$ (%) | 0.44 |
| $R_v(35°)$ (%) | 0.42 |
| h (°) | 313 |
| $R_{vmin}/R_v(15°)$ | 0.77 |
| Total thickness | 374.9 nm |

Example 10
Substrate + primer/hard coat

| | |
|---|---|
| $Ta_2O_5$ | 18.9 nm |
| $SiO_2$ | 68.6 nm |
| $Ta_2O_5$ | 38.6 nm |
| $SiO_2$ | 43.3 nm |
| $Ta_2O_5$ | 59.9 nm |
| $SnO_2$ | 6.5 nm |
| $SiO_2$ | 107.7 nm |

Top coat

| | |
|---|---|
| $R_{T1}$ | 1.77 |
| $Rm^{B1}$ (%) | 25.55 |
| $Rm^{B2}$ (%) | 3.13 |
| $Rm^{B3}$ (%) | 15 |
| $R_v(15°)$ (%) | 0.42 |
| $R_v(35°)$ (%) | 0.36 |
| h (°) | 313 |
| $R_{vmin}/R_v(15°)$ | 0.73 |
| Total thickness | 343.4 nm |

Example 12
Substrate + primer/hard coat

| | |
|---|---|
| $ZrO_2$ | 36.9 nm |
| $SiO_2$ | 29.4 nm |
| $ZrO_2$ | 67.8 nm |
| $SiO_2$ | 86.6 nm |
| $ZrO_2$ | 17 nm |
| $SiO_2$ | 77.8 nm |
| $ZrO_2$ | 67.1 nm |
| $SnO_2$ | 6.5 nm |
| $SiO_2$ | 101.2 nm |

Top coat

| | |
|---|---|
| $R_{T1}$ | 1.51 |
| $Rm^{B1}$ (%) | 27.38 |
| $Rm^{B2}$ (%) | 2.26 |
| $Rm^{B3}$ (%) | 15 |
| $R_v(15°)$ (%) | 0.35 |
| $R_v(35°)$ (%) | 0.27 |
| h (°) | 316 |
| $R_{vmin}/R_v(15°)$ | 0.66 |
| Total thickness | 490.2 nm |

Example 13
Substrate + primer/hard coat

| | |
|---|---|
| $Ta_2O_5$ | 33.5 nm |
| $SiO_2$ | 32.9 nm |

| | |
|---|---:|
| Ta$_2$O$_5$ | 53.8 nm |
| SiO$_2$ | 89.4 nm |
| Ta$_2$O$_5$ | 21 nm |
| SiO$_2$ | 58.7 nm |
| Ta$_2$O$_5$ | 62.9 nm |
| SnO$_2$ | 6.5 nm |
| SiO$_2$ | 99.5 nm |
| Top coat | |
| $R_{T1}$ | 1.58 |
| $Rm^{B1}$ (%) | 30.6 |
| $Rm^{B2}$ (%) | 1.46 |
| $Rm^{B3}$ (%) | 15 |
| $R_v(15°)$ (%) | 0.36 |
| $R_v(35°)$ (%) | 0.28 |
| h (°) | 314 |
| $R_{vmin}/R_v(15°)$ | 0.66 |
| Total thickness | 458.1 nm |

Example 14
Substrate + primer/hard coat

| | |
|---|---:|
| TiO$_2$ | 14.8 nm |
| SiO$_2$ | 68.3 nm |
| TiO$_2$ | 20.8 nm |
| SiO$_2$ | 91.2 nm |
| TiO$_2$ | 31.2 nm |
| SiO$_2$ | 32.5 nm |
| TiO$_2$ | 57.1 nm |
| SnO$_2$ | 6.5 nm |
| SiO$_2$ | 99.7 nm |
| Top coat | |
| $R_{T1}$ | 2.24 |
| $Rm^{B1}$ (%) | 35.12 |
| $Rm^{B2}$ (%) | 0.97 |
| $Rm^{B3}$ (%) | 15 |
| $R_v(15°)$ (%) | 0.3 |
| $R_v(35°)$ (%) | 0.28 |
| h (°) | 316 |
| $R_{vmin}/R_v(15°)$ | 0.74 |
| Total thickness | 422.2 nm |

Example 15
Substrate + primer/hard coat

| | |
|---|---:|
| ZrO$_2$ | 36.6 nm |
| SiO$_2$ | 34.7 nm |
| ZrO$_2$ | 55 nm |
| SiO$_2$ | 150 nm |
| ZrO$_2$ | 2.4 nm |
| SiO$_2$ | 66.8 nm |
| ZrO$_2$ | 60.1 nm |
| SnO$_2$ | 6.5 nm |
| SiO$_2$ | 101.7 nm |
| Top coat | |
| $R_{T1}$ | 2.44 |
| $Rm^{B1}$ (%) | 25.64 |
| $Rm^{B2}$ (%) | 2.58 |
| $Rm^{B3}$ (%) | 15 |
| $R_v(15°)$ (%) | 0.36 |
| $R_v(35°)$ (%) | 0.28 |
| h (°) | 314 |
| $R_{vmin}/R_v(15°)$ | 0.66 |
| Total thickness* | 514 nm |

Example 16
Substrate + primer/hard coat

| | |
|---|---:|
| ZrO$_2$ | 39.9 nm |
| SiO$_2$ | 29.8 nm |
| ZrO$_2$ | 57.2 nm |

| | |
|---|---:|
| SiO$_2$ | 150 nm |
| Ta$_2$O$_5$ | 8.7 nm |
| SiO$_2$ | 54.5 nm |
| Ta$_2$O$_5$ | 50.9 nm |
| SnO$_2$ | 6.5 nm |
| SiO$_2$ | 103.6 nm |
| Top coat | |
| $R_{T1}$ | 2.39 |
| $Rm^{B1}$ (%) | 26.42 |
| $Rm^{B2}$ (%) | 2.33 |
| $Rm^{B3}$ (%) | 15 |
| $R_v(15°)$ (%) | 0.34 |
| $R_v(35°)$ (%) | 0.26 |
| h (°) | 314 |
| $R_{vmin}/R_v(15°)$ | 0.66 |
| Total thickness* | 501.2 nm |

Example 18
Substrate + primer/hard coat

| | |
|---|---:|
| ZrO$_2$ | 36.4 nm |
| SiO$_2$ | 35.5 nm |
| ZrO$_2$ | 65.1 nm |
| SiO$_2$ | 77.2 nm |
| ZrO$_2$ | 26.1 nm |
| SiO$_2$ | 72.5 nm |
| ZrO$_2$ | 63.9 nm |
| SnO$_2$ | 6.5 nm |
| SiO$_2$ | 105.7 nm |
| Top coat | |
| $R_{T1}$ | 1.47 |
| $Rm^{B1}$ (%) | 34.41 |
| $Rm^{B2}$ (%) | 3.31 |
| $Rm^{B3}$ (%) | 20 |
| $R_v(15°)$ (%) | 0.47 |
| $R_v(35°)$ (%) | 0.35 |
| h (°) | 316 |
| $R_{vmin}/R_v(15°)$ | 0.61 |
| Total thickness | 488.8 nm |

Example 19
Substrate + primer/hard coat

| | |
|---|---:|
| Ta$_2$O$_5$ | 34.1 nm |
| SiO$_2$ | 31.6 nm |
| Ta$_2$O$_5$ | 60.2 nm |
| SiO$_2$ | 76.8 nm |
| Ta$_2$O$_5$ | 26.2 nm |
| SiO$_2$ | 59.8 nm |
| Ta$_2$O$_5$ | 59 nm |
| SnO$_2$ | 6.5 nm |
| SiO$_2$ | 103.5 nm |
| Top coat | |
| $R_{T1}$ | 1.46 |
| $Rm^{B1}$ (%) | 37.22 |
| $Rm^{B2}$ (%) | 2.35 |
| $Rm^{B3}$ (%) | 20 |
| $R_v(15°)$ (%) | 0.52 |
| $R_v(35°)$ (%) | 0.34 |
| h (°) | 313 |
| $R_{vmin}/R_v(15°)$ | 0.61 |
| Total thickness | 457.7 nm |

Example 20
Substrate + primer/hard coat

| | |
|---|---:|
| TiO$_2$ | 20 nm |
| SiO$_2$ | 53.8 nm |
| TiO$_2$ | 33.6 nm |
| SiO$_2$ | 69.4 nm |

-continued

| | |
|---|---|
| TiO$_2$ | 35.7 nm |
| SiO$_2$ | 37.8 nm |
| TiO$_2$ | 50.5 nm |
| SnO$_2$ | 6.5 nm |
| Top coat | |
| R$_{T1}$ | 1.81 |
| Rm$^{B1}$ (%) | 44.06 |
| Rm$^{B2}$ (%) | 1.27 |
| Rm$^{B3}$ (%) | 20 |
| R$_v$(15°) (%) | 0.38 |
| R$_v$(35°) (%) | 0.33 |
| h (°) | 316 |
| R$_{vmin}$/R$_v$(15°) | 0.74 |
| Total thickness | 410.8 nm |

Example 21
Substrate + primer/hard coat

| | |
|---|---|
| ZrO$_2$ | 39.3 nm |
| SiO$_2$ | 36.5 nm |
| ZrO$_2$ | 50.2 nm |
| SiO$_2$ | 150 nm |
| Ta$_2$O$_5$ | 9.6 nm |
| SiO$_2$ | 61 nm |
| Ta$_2$O$_5$ | 48.7 nm |
| SnO$_2$ | 6.5 nm |
| SiO$_2$ | 107.6 nm |
| Top coat | |
| R$_{T1}$ | 2.6 |
| Rm$^{B1}$ (%) | 32.41 |
| Rm$^{B2}$ (%) | 3.72 |
| Rm$^{B3}$ (%) | 20 |
| R$_v$(15°) (%) | 0.48 |
| R$_v$(35°) (%) | 0.31 |
| h (°) | 313 |
| R$_{vmin}$/R$_v$(15°) | 0.61 |
| Total thickness* | 509.4 nm |

Comparative example 1
Substrate + primer/hard coat

| | |
|---|---|
| ZrO$_2$ | 34 nm |
| SiO$_2$ | 35 nm |
| ZrO$_2$ | 73 nm |
| SiO$_2$ | 110 nm |
| Top coat | |
| R$_{T1}$ | 1.36 |
| Rm$^{B1}$ (%) | 11.8 |
| Rm$^{B2}$ (%) | 2.3 |
| Rm$^{B3}$ (%) | 8.7 |
| R$_v$(15°) (%) | 0.5 |
| R$_v$(35°) (%) | 0.57 |
| h (°) | 309 |
| R$_{vmin}$/R$_v$(15°) | 0.90 |
| Total thickness | 252 nm |

Comparative example 2
Substrate + primer/hard coat

| | |
|---|---|
| ZrO$_2$ | 40.6 nm |
| SiO$_2$ | 33.7 nm |
| ZrO$_2$ | 59.4 nm |
| SnO$_2$ | 6.5 nm |
| SiO$_2$ | 114.8 nm |
| Top coat | |
| R$_{T1}$ | 1.39 |
| Rm$^{B1}$ (%) | 13.2 |
| Rm$^{B2}$ (%) | 2.6 |
| Rm$^{B3}$ (%) | 8.5 |
| R$_v$(15°) (%) | 0.66 |
| R$_v$(35°) (%) | 0.87 |
| h (°) | 311 |
| R$_{vmin}$/R$_v$(15°) | 0.99 |
| Total thickness | 255 nm |

Comparative example 3
Substrate + primer/hard coat

| | |
|---|---|
| ZrO$_2$ | 34.2 nm |
| SiO$_2$ | 41.1 nm |
| ZrO$_2$ | 57.9 nm |
| SnO$_2$ | 6.5 nm |
| SiO$_2$ | 115.3 nm |
| Top coat | |
| R$_{T1}$ | 1.59 |
| Rm$^{B1}$ (%) | 14.81 |
| Rm$^{B2}$ (%) | 3.61 |
| Rm$^{B3}$ (%) | 10 |
| R$_v$(15°) (%) | 0.6 |
| R$_v$(35°) (%) | 0.66 |
| h (°) | 309 |
| R$_{vmin}$/R$_v$(15°) | 0.9 |
| Total thickness | 254.9 nm |

Comparative example 4
Substrate + primer/hard coat

| | |
|---|---|
| ZrO$_2$ | 38.5 nm |
| SiO$_2$ | 45.7 nm |
| ZrO$_2$ | 53.1 nm |
| SnO$_2$ | 6.5 nm |
| SiO$_2$ | 123.3 nm |
| Top coat | |
| R$_{T1}$ | 1.72 |
| Rm$^{B1}$ (%) | 20.72 |
| Rm$^{B2}$ (%) | 6.25 |
| Rm$^{B3}$ (%) | 15 |
| R$_v$(15°) (%) | 0.97 |
| R$_v$(35°) (%) | 0.9 |
| h (°) | 307 |
| R$_{vmin}$/R$_v$(15°) | 0.85 |
| Total thickness | 267.1 nm |

Comparative example 5
Substrate + primer/hard coat

| | |
|---|---|
| ZrO$_2$ | 44.5 nm |
| SiO$_2$ | 48.8 nm |
| ZrO$_2$ | 47.2 nm |
| SnO$_2$ | 6.5 nm |
| SiO$_2$ | 133.3 nm |
| Top coat | |
| R$_{T1}$ | 1.85 |
| Rm$^{B1}$ (%) | 26.08 |
| Rm$^{B2}$ (%) | 9.39 |
| Rm$^{B3}$ (%) | 20 |
| R$_v$(15°) (%) | 1.48 |
| R$_v$(35°) (%) | 1.25 |
| h (°) | 305 |
| R$_{vmin}$/R$_v$(15°) | 0.83 |
| Total thickness | 280.3 nm |

Comparative example 6
Substrate + primer/hard coat

| | |
|---|---|
| SiO$_2$ | 150 nm |
| ZrO$_2$ | 19.8 nm |
| SiO$_2$ | 30.6 nm |

-continued

| | |
|---|---|
| ZrO$_2$ | 70.1 nm |
| ITO | 6.5 nm |
| SiO$_2$ | 93.2 nm |

| Top coat | |
|---|---|
| R$_{T1}$ | 1.28 |
| Rm$^{B1}$ (%) | 2.06 |
| Rm$^{B2}$ (%) | 0.35 |
| Rm$^{B3}$ (%) | 1.11 |
| R$_v$(15°) (%) | 0.15 |
| R$_v$(35°) (%) | 0.39 |
| h (°) | 300 |
| R$_{vmin}$/R$_v$(15°) | 0.99 |
| Total thickness* | 370.2 nm |

| Comparative example 7 Substrate + primer/hard coat | |
|---|---|
| SiO$_2$ | 150 nm |
| ZrO$_2$ | 15.5 nm |
| SiO$_2$ | 28.9 nm |
| ZrO$_2$ | 88 nm |
| ITO | 6.5 nm |
| SiO$_2$ | 89.3 nm |

| Top coat | |
|---|---|
| R$_{T1}$ | 1.08 |
| Rm$^{B1}$ (%) | 1.79 |
| Rm$^{B2}$ (%) | 0.65 |
| Rm$^{B3}$ (%) | 1.22 |
| R$_v$(15°) (%) | 0.22 |
| R$_v$(35°) (%) | 0.36 |
| h (°) | 287 |
| R$_{vmin}$/R$_v$(15°) | 0.97 |
| Total thickness* | 378 nm |

| Comparative example 8 Substrate + primer/hard coat | |
|---|---|
| SiO$_2$ | 150 nm |
| ZrO$_2$ | 20.5 nm |
| SiO$_2$ | 29.9 nm |
| ZrO$_2$ | 86.4 nm |
| ITO | 6.5 nm |
| SiO$_2$ | 92.1 nm |

| Top coat | |
|---|---|
| R$_{T1}$ | 1.08 |
| Rm$^{B1}$ (%) | 2.91 |
| Rm$^{B2}$ (%) | 0.43 |
| Rm$^{B3}$ (%) | 1.64 |
| R$_v$(15°) (%) | 0.22 |
| R$_v$(35°) (%) | 0.42 |
| h (°) | 300 |
| R$_{vmin}$/R$_v$(15°) | 1 |
| Total thickness* | 386 nm |

| Comparative example 9 Substrate + primer/hard coat | |
|---|---|
| SiO$_2$ | 150 nm |
| ZrO$_2$ | 11 nm |
| SiO$_2$ | 33 nm |
| ZrO$_2$ | 90 nm |
| ITO | 6.5 nm |
| SiO$_2$ | 84 nm |

| Top coat | |
|---|---|
| R$_{T1}$ | 1.09 |
| Rm$^{B1}$ (%) | 1.56 |
| Rm$^{B2}$ (%) | 0.69 |
| Rm$^{B3}$ (%) | 1.22 |
| R$_v$(15°) (%) | 0.22 |
| R$_v$(35°) (%) | 0.49 |
| h (°) | 301 |
| R$_{vmin}$/R$_v$(15°) | 0.99 |
| Total thickness* | 374.5 nm |

Figure 11:
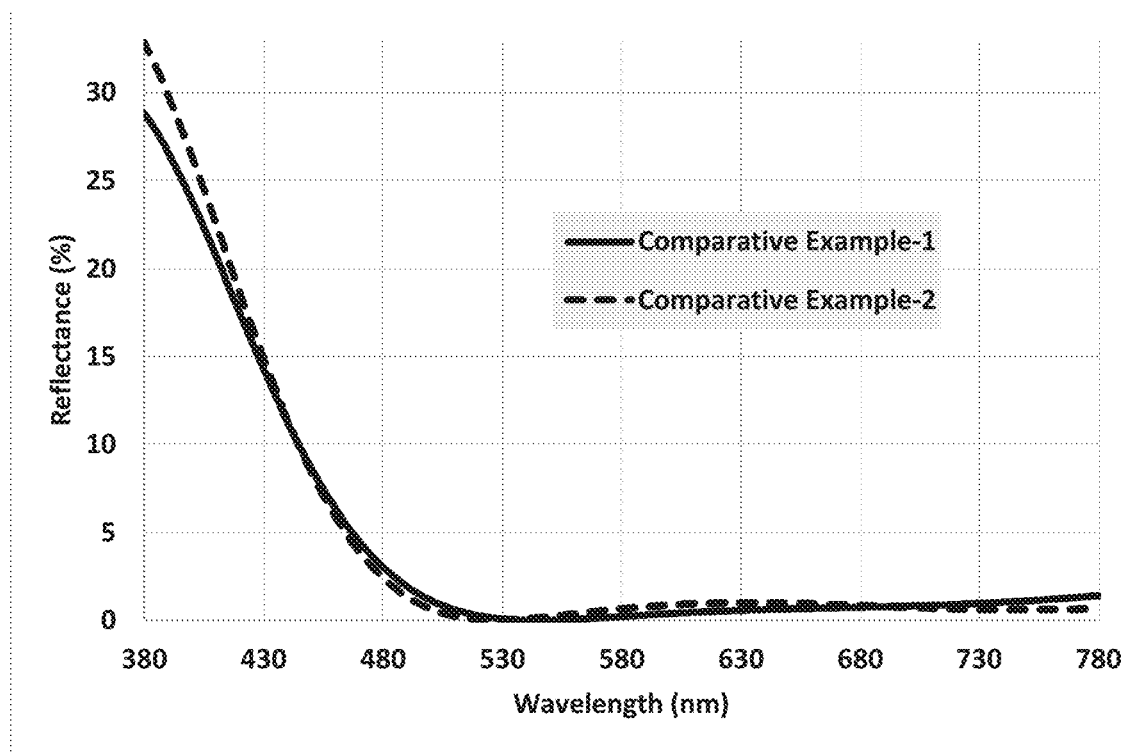
Figure 12:
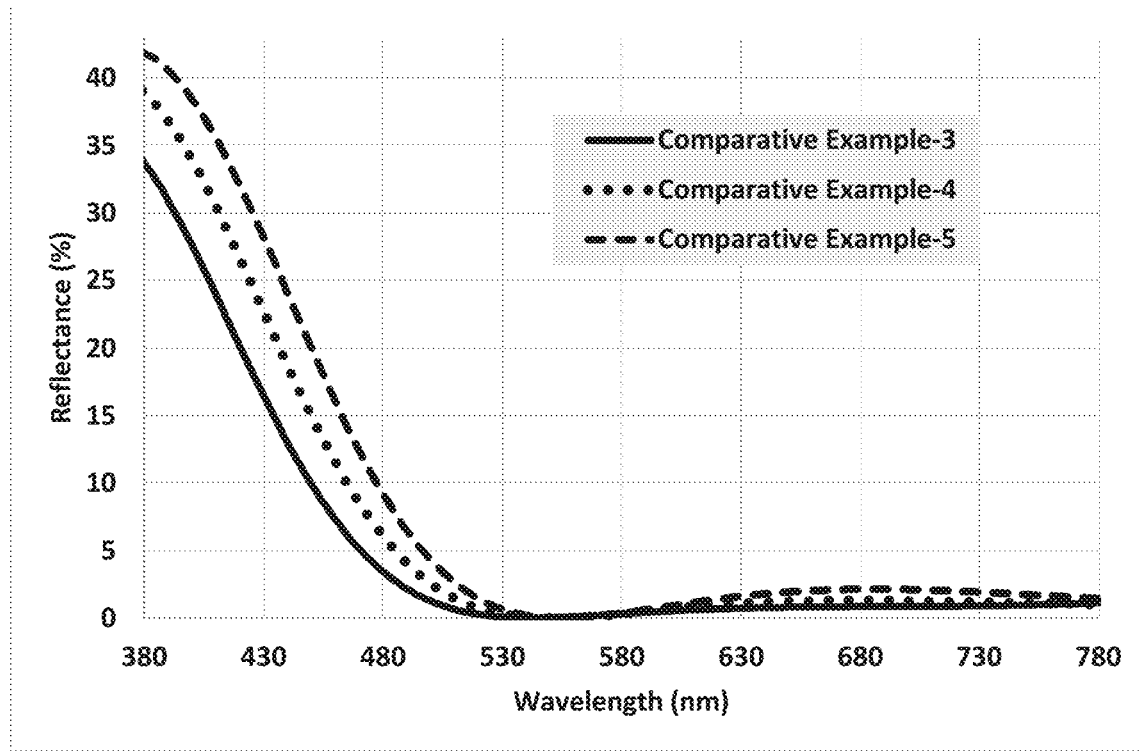
Figure 13:
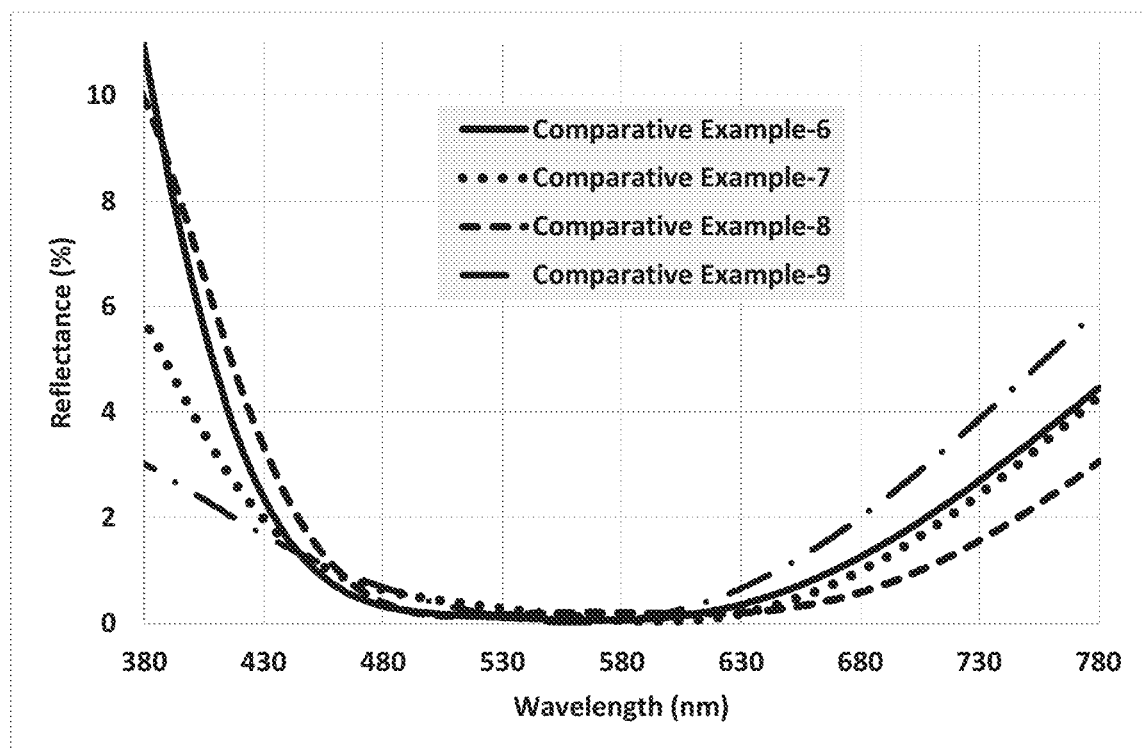

The reflection spectra of the different coatings are shown on FIGS. 3-13. The antireflection coatings according to the invention have very low mean light reflection factors in the visible range R$_v$, which are similar to those of US 2016/154254 and significantly lower than those of WO 2013/171434, and therefore exhibit outstanding transparency properties. Meanwhile, these coatings also have higher R$_m^{B1}$ (≥17%) and R$_m^{B3}$ (≥10%) reflection factors than prior art coatings, indicating a more effective protection against phototoxic blue light and particularly against LED blue light emission from digital devices, without being detrimental to the antireflection performances in the visible region. In fact, the present invention provides antireflection coatings that do not make any compromise between low reflection properties in the visible range (R$_v$) and significant reflection of harmful blue light (R$_m^{B1}$, R$_m^{B3}$).

Thus, the ophthalmic lenses of the invention enable to prevent a degenerative process of a wearer's eye as a consequence of blue light-induced phototoxicity, such as the age-related macular degeneration.

R$_m^{B2}$ of these coatings is low and in particular generally lower than that of WO 2013/171434, which is chronobiologically more desirable.

All the inventive filters are broad band filters showing a selective reflection or transmission of light in a specific wavelength range, with a reflection peak having a FWHM higher than 80 nm and generally lower than 150 nm.

It can be observed that increasing the reflection factor of LED light (R$_m^{B3}$) from 10% to 15% or 15% to 20% tends to slightly increase the mean light reflection factors in the visible range R$_v$.

In addition, the invention provides coatings such as those of examples 1, 2, 5, 6, 7, 9, 15, 16, 21 having high R$_{T1}$ ratios, and thus higher abrasion resistance and heat resistance than the comparative coatings.

The antireflection coatings exhibit a strong multiangular efficiency, since they have a parameter R$_{vmin}$/R$_v$(15°)<0.8, R$_v$(15°) being as defined above, and in the range [0°-50°] of angles of incidence θ, the mean light reflection factor as a function of incident angle R$_v$(θ) on the coated main face presents a minimum value R$_{vmin}$ for an angle of incidence θ$_{min}$ comprised in the range [20°-50°]. They offer a robust angular protection from 0° to 50° at a level higher than that obtained by the prior art lenses.

All of the prepared coatings have colorimetric coefficients with a robustness compatible with industrialization (σh≤1.02°).

The invention claimed is:

1. An optical lens comprising a substrate having a front main face and a rear main face, at least one of the main faces comprising a multilayer antireflection coating, wherein the multilayer antireflection coating(s) present on the main face(s) provide(s) the optical lens with an average blue light reflection factor R$_m^{B1}$ within a wavelength range of from 420 nm to 450 nm, which is higher than or equal to 17%, for an angle of incidence ranging from 0° to 15°, and wherein the multilayer antireflection coating provides said at least one main face with a mean light reflection factor R$_v$ between 380 nm and 780 nm, defined in the ISO 13666:1998 standard, lower than or equal to 0.5% for an angle of incidence ranging from 0° to 15°, wherein said multilayer antireflection coating comprises a stack of at least one high refractive index layer having a refractive index higher than 1.55 and at least one low refractive index layer having a refractive index of 1.55 or less.

2. The optical lens of claim 1, wherein the multilayer antireflection coating(s) present on the main face(s) provide(s) the optical lens with an average blue light reflection factor $R_m^{B2}$ within a wavelength range of from 465 nm to 495 nm, lower than or equal to 5%, for an angle of incidence ranging from 0° to 15°.

3. The optical lens of claim 1, wherein said mean light reflection factor $R_v$ is lower than or equal to 0.3%, for an angle of incidence ranging from 0° to 15°.

4. The optical lens of claim 1, wherein the multilayer antireflection coating(s) present on the main face(s) provide(s) the optical lens with an average blue light reflection factor $R_m^{B3}$ within a wavelength range of from 440 nm to 460 nm, higher than or equal to 10%, for an angle of incidence ranging from 0° to 15°.

5. The optical lens of claim 1, wherein the multilayer antireflection coating(s) present on the main face(s) provide(s) the optical lens with an average blue light reflection factor $R_m^{B3}$ within a wavelength range of from 440 nm to 460 nm, higher than or equal to 15%, for an angle of incidence ranging from 0° to 15°.

6. The optical lens of claim 1, wherein the spectral reflectivity curve of said multilayer antireflection coating for an angle of incidence ranging from 0° to 15° has a reflection peak centered at a wavelength higher than or equal to 350 nm and lower than or equal to 410 nm.

7. The optical lens of claim 6, wherein said reflection peak is centered at a wavelength lower than or equal to 400 nm.

8. The optical lens of claim 6, wherein said reflection peak exhibits a full width at half maximum lower than 150 nm.

9. The optical lens of claim 6, wherein said reflection peak exhibits a full width at half maximum higher than 80 nm.

10. The optical lens of claim 1, wherein said multilayer antireflection coating comprises a number of layers lower than or equal to 11.

11. The optical lens of claim 1, wherein said multilayer antireflection coating comprises a number of layers ranging from 5 to 10.

12. The optical lens of claim 1, wherein said multilayer antireflection coating has a total thickness lower than or equal to 700 nm.

13. The optical lens of claim 1, further defined as an ophthalmic lens.

14. The optical lens of claim 1, wherein the ratio:

$$R_{T1} = \frac{\text{sum of the physical thicknesses of the low refractive index layers of the multilayer antireflection coating}}{\text{sum of the physical thicknesses of the high refractive index layers of the multilayer antireflection coating}}$$

is higher than or equal to 1.6.

15. The optical lens of claim 1, wherein $R_{T1}$ is higher than or equal to 1.75.

16. The optical lens of claim 1, wherein the outermost layer of said multilayer antireflection coating is a low refractive index layer having a refractive index of 1.55 or less and a thickness higher than or equal to 100 nm.

17. The optical lens of claim 1, wherein said mean light reflection factor $R_v$ between 380 nm and 780 nm for an angle of incidence of 15° is higher than the mean light reflection factor $R_v$ between 380 nm and 780 nm for an angle of incidence of 35°.

18. The optical lens of claim 1, wherein the mean light reflection function of incident angle $R_v(\theta)$ on said at least one main face has a minimum value $R_{vmin}$ for an angle of incidence $\theta_{min}$ comprised in the range [20°-50°] and $R_{vmin}/R_v(15°)<0.8$, $R_v(15°)$ being the mean light reflection factor for an angle of incidence $\theta$ of 15° on said at least one main face, defined in the ISO 13666:1998 standard.

19. The optical lens of claim 1, wherein the average blue light reflection factor $R_m^{B1}$ within a wavelength range of from 420 nm to 450 nm, for an angle of incidence ranging from 0° to 15°, is higher than the average blue light reflection factor $R_m^{B3}$ within a wavelength range of from 440 nm to 460 nm, for an angle of incidence ranging from 0° to 15°.

20. The optical lens of claim 1, wherein the average blue light reflection factor $R_m^{B1}$ within a wavelength range of from 420 nm to 450 nm, for an angle of incidence ranging from 0° to 15°, is higher than or equal to 25%.

* * * * *